US009028795B2

(12) United States Patent
Yilmaz et al.

(10) Patent No.: US 9,028,795 B2
(45) Date of Patent: May 12, 2015

(54) PROCESS FOR THE ORGANOTEMPLATE-FREE SYNTHETIC PRODUCTION OF A ZEOLITIC MATERIAL USING RECYCLED MOTHER LIQUOR

(75) Inventors: Bilge Yilmaz, New York, NY (US); Ulrich Müller, Neustadt (DE); Faruk Özkirim, Ludwigshafen (DE); Meike Pfaff, Neunkirchen (DE); Mike Haas, Mannheim (DE); Feng-Shou Xiao, Changchun (CN)

(73) Assignee: BASF SE, Ludwigshafen (DE)

( * ) Notice: Subject to any disclaimer, the term of this patent is extended or adjusted under 35 U.S.C. 154(b) by 333 days.

(21) Appl. No.: 13/606,614

(22) Filed: Sep. 7, 2012

(65) Prior Publication Data
US 2013/0064758 A1    Mar. 14, 2013

(30) Foreign Application Priority Data

Sep. 9, 2011   (WO) ................. PCT/CN2011/079502

(51) Int. Cl.
C01B 39/46    (2006.01)
C01B 39/30    (2006.01)
C01B 39/02    (2006.01)
(52) U.S. Cl.
CPC ............... *C01B 39/46* (2013.01); *C01B 39/30* (2013.01); *C01B 39/02* (2013.01)
(58) Field of Classification Search
CPC .......... C01B 39/02; C01B 39/30; C01B 39/46
USPC .......................................... 423/709
See application file for complete search history.

(56) References Cited

U.S. PATENT DOCUMENTS 6,099,820 A *  8/2000  Miller ........................ 423/700
6,974,889 B1 * 12/2005  Verduijn et al. ............. 585/528
(Continued)

FOREIGN PATENT DOCUMENTS

CN       102040229     5/2011
WO    WO 2010/146156   12/2010

OTHER PUBLICATIONS

Majano, Gerardo et al., "Al-Rich Zeolite Beta by Seeding in the Absence of Organic Template", *Chem. Mater.*, 21 XP-002605661 2009, 4184-4191.

(Continued)

*Primary Examiner* — David M Brunsman
(74) *Attorney, Agent, or Firm* — Servilla Whitney LLC

(57) ABSTRACT

The present invention relates to an organotemplate-free synthetic process for the production of a zeolitic material comprising $YO_2$ and $X_2O_3$, wherein said process comprises the steps of
(1) preparing a mixture comprising seed crystals, one or more sources for $YO_2$, one or more sources for $X_2O_3$, and one or more solvents;
(2) crystallizing the mixture obtained in step (1) to obtain a zeolitic material comprising $YO_2$ and $X_2O_3$ as a crystallization product;
wherein Y is a tetravalent element, and X is a trivalent element, and
wherein at least a portion of the mother liquor obtained in step (2) is recycled to step (1) as a source for $YO_2$, optionally after concentration of the mother liquor.

26 Claims, 5 Drawing Sheets

(56) References Cited

U.S. PATENT DOCUMENTS 7,264,789 B1* 9/2007 Van Den Berge et al. .... 423/716
2013/0005563 A1* 1/2013 Matsuo et al. .................. 502/60

OTHER PUBLICATIONS

Xie, Bin et al., "Organotemplate-Free and Fast Route for Synthesizing Beta Zeolite", *Chemistry of Materials*, vol. 20, No. 14 XP-002605659 Jul. 22, 2008, 3 pgs.

Xie, Bin et al., "Seed-directed Synthesis of Zeolites with Enhanced Performance in the Absence of Organic Templates", *The Royal Society of Chemistry* 2011, 21 pgs.

Yamamoto, Katsutoshi et al., "Synthesis and structure analysis of RUB-50, an LEV-type aluminosilicate zeolite", *Microporous and Mesoporous Materials* 128 2010, 150-157.

PCT International Search Report and Written Opinion in PCT/IB2012/054637, mailed Feb. 7, 2013, 11 pgs.

* cited by examiner

PROCESS FOR THE ORGANOTEMPLATE-FREE SYNTHETIC PRODUCTION OF A ZEOLITIC MATERIAL USING RECYCLED MOTHER LIQUOR

CROSS-REFERENCE TO RELATED APPLICATIONS

This application claims priority under 365 (c) to PCT/CN2011/079502, filed Sep. 9, 2011, the contents of which is specifically incorporated by reference herein in its entirety.

TECHNICAL FIELD

The present invention relates to an organotemplate-free synthetic process for the production of a zeolitic material as well as to a synthetic organotemplate-free zeolitic material which may be obtained from such a process. Furthermore, the present invention relates to the use of a zeolitic material as may be obtained from such an organotemplate-free synthesis.

BACKGROUND

Zeolites and zeolitic materials constitute a prominent class of chemical compounds with a wide range of applications due to their unique microporous structure. A prominent and well studied example for a zeolitic material is for example zeolite Beta, which is a zeolite having the BEA framework structure containing $SiO_2$ and $Al_2O_3$ in its framework and which is considered to be one of the most important nanoporous catalysts with its three-dimensional 12-membered-ring (12 MR) pore/channel system. As such, it has been widely used in petroleum refining and fine chemical industries. A further notable example is Levyne, which displays an LEV-type framework characterized by heptadecahedral cavities to which these zeolites owe their large micropore volume, although the structure only has small eight-membered ring (8 MR) pore openings. The framework density of Levyne is comparable to those of Chabazite (CHA) and Erionite (ERI) having closely related framework structures. Such small pore zeolites are of importance because they exhibit zeolite-specific definite shape selectivity with respect to reactant molecules in catalyst applications. Furthermore, such small pore zeolites having large micropore volumes are attractive due to their large adsorption capacities.

For achieving such microporous frameworks, zeolites are typically synthesized in the presence of templating agents, usually small organic molecules referred to as organotemplates. In the original synthesis of zeolite Beta for example, which was first described in U.S. Pat. No. 3,308,069, the tetraethylammonium cation was used as the structure directing agent. Later on, other structure directing agents found use in the synthesis of zeolite Beta such as dibenzyl-1,4-diazabicyclo[2,2,2]octane in U.S. Pat. No. 4,554,145 or dibenzylmethylammonium in U.S. Pat. No. 4,642,226. Levyne-type zeolites, one the other hand, were prepared using exotic organotemplates as structure directing agents, such as Quinuclidine-based templates, such that their synthesis typically involved high costs. Lower cost alternatives use diethyldimethylammonium hydroxide as a structure directing agent wherein the diethyldimethylammonium cations act as the organotemplate. U.S. Pat. No. 7,264,789 B1, for example discloses a method for preparing LEV-type zeolites which alternatively uses choline and diethyldimethylammonium as organotemplate. Recently, the LEV-type zeolite RUB-50 was reported in Yamamoto et al. Micropor. Mesopor. Mater. 2009, Vol. 128, pp. 150-157, which was synthesized using the diethyldimethylammonium cation as oraganotemplate.

The use of organic template compounds in the synthesis of these zeolitic materials possesses the major disadvantage that the tetraalkylammonium salts and other organic compounds employed therein are expensive fine chemicals. In addition to this, the resulting products inevitably contain the organotemplates which are encapsulated in the zeolitic framework created around them, such that a removal step becomes necessary in order to open the porous volume of the material for actual utilization.

In addition to these drawbacks, complete removal of the organic template compound is often difficult and may normally only be achieved by calcination at higher temperatures, usually at temperatures ranging from 200-930° C. or even higher. This procedure not only greatly increases the production costs since the organic template is destroyed in the process and may not be recycled, it also further increases the production time, results in excess energy consumption, and produces harmful gases and other unwanted waste products. Finally, the harsh thermal treatment ultimately limits the production to thermally stable zeolites, and in particular to high-silica zeolitic materials. Although ion-exchange methods have been developed as an environmentally friendly alternative to calcination for removing the organotemplate, only part of the organic templates may successfully be recycled, the remainder interacting too strongly with the zeolite framework for removal.

Recently, however, it has been discovered that zeolite Beta and Levyne may also be prepared in the absence of the organotemplates, which until then had always been used as structure directing agent. Thus, in Xie et al., Chem. Mater. 2008, 20, pp. 4533-4535, a process for the synthesis of zeolite Beta is shown, in which crystallization of an aluminosilicate gel is conducted using zeolite Beta seed crystals. In WO 2010/146156 A the organotemplate-free synthesis of zeolitic materials having the BEA framework structure, and in particular to the organotemplate-free synthesis of zeolite Beta is described. In Majano et al., Chem. Mater. 2009, 21, pp. 4184-4191, on the other hand, Al-rich zeolite Beta materials having Si/Al ratios as low as 3.9 are discussed which may be obtained from reactions employing seeding in the absence of organic templates. As regards Levyne, a seed-directed synthesis in the absence of organic templates is described in Xie et al., Chem. Commun. 2011, 47, pp. 3945-3947.

Although the seeded synthesis offers several advantages compared to the previous routes employing organotemplates, the organotemplate-free synthesis affords clearly lower yields compared to the latter. As a means of increasing the yield in the organotemplate-free synthesis of zeolite Beta, Majano et al. describes the use of nano-sized zeolite Beta seeds. Although this is reported to improve the yield to some extent, the yields achieved by templated synthetic methodologies may nevertheless not be realized, let alone surpassed. Accordingly, although improvements have been made with respect to avoiding the use of costly organotemplates in the synthesis of zeolitic materials, there is an ongoing need to find an efficient method for the production thereof which is not only environmentally friendly by may also actually compete with the templated methodologies in terms of both the time and costs of production.

SUMMARY

The present invention includes the following embodiments, wherein these include the specific combinations of embodiments as indicated by the respective interdependencies defined therein:

1. An organotemplate-free synthetic process for the production of a zeolitic material comprising $YO_2$ and $X_2O_3$, wherein said process comprises the steps of
    (1) preparing a mixture comprising seed crystals, one or more sources for $YO_2$, one or more sources for $X_2O_3$, and one or more solvents;
    (2) crystallizing the mixture obtained in step (1) to obtain a zeolitic material comprising $YO_2$ and $X_2O_3$ as a crystallization product;
    wherein Y is a tetravalent element, and X is a trivalent element, and
    wherein at least a portion of the mother liquor obtained in step (2) is recycled to step (1) as a source for $YO_2$, optionally after concentration of the mother liquor.
2. The process of embodiment 1, further comprising one or more of the following steps of
    (3) separating at least a portion of the zeolitic material from the mother liquor obtained in step (2).
3. The process of embodiment 2, wherein in step (3) the zeolitic material or a portion thereof is separated from the mother liquor by one or more steps of filtration, centrifugation and/or decantation methods, preferably by one or more filtration steps.
4. The process of embodiment 2 or 3, further comprising one or more of the following steps of
    (4) washing the zeolitic material, and/or
    (5) drying and/or calcinating the zeolitic material, and/or
    (6) subjecting the zeolitic material to one or more ion-exchange procedures,
    wherein the steps (4) and/or (5) and/or (6) can be conducted in any order,
    wherein one or more of said steps is preferably repeated one or more times.
5. The process of any of embodiments 1 to 4, wherein at least a portion of the zeolitic material obtained in step (2) is recycled to step (1) as seed crystals.
6. The process of embodiment 5, wherein the zeolitic material obtained in step (2) or a portion thereof is recycled to step (1) as seed crystals after the step or steps of
    (3) separating at least a portion of the zeolitic material from the mother liquor obtained in step (2),
    (4) washing the zeolitic material, and/or
    (5) drying and/or calcinating the zeolitic material,
    wherein preferably the zeolitic material is recycled as seed crystals after having been subject to step (3) followed by steps (4) and/or (5), more preferably followed by steps (4) and (5), and even more preferably followed by step (4).
7. The process of embodiment 5, wherein zeolitic material obtained in step (2) or a portion thereof is directly recycled to step (1) as seed crystals.
8. The process of any of embodiments 1 to 7, wherein at least a portion of the reaction mixture obtained from crystallization in step (2) is recycled to step (1) as seed crystals and as a source for $YO_2$.
9. The process of any of embodiments 1 to 8, wherein the amount of X in wt.-% contained in the mother liquor obtained in step (2), based on 100 wt.-% of the mother liquor, is equal to 50% or less of the amount of X in wt.-% from the one or more sources for $X_2O_3$ contained in the mixture obtained in step (1), based of 100 wt.-% of said mixture, which was crystallized in step (2), preferably 30% or less the amount, more preferably 20% or less, more preferably 15% or less, more preferably 10% or less, more preferably 8% or less, more preferably 7% or less, and even more preferably 6% or less.
10. The process of any of embodiments 1 to 9, wherein the ratio of the Y:X molar ratio of the mother liquor obtained in step (2) to the Y:X molar ratio of the one or more sources for $YO_2$ and the one or more sources for $X_2O_3$ contained in the mixture obtained in step (1), which was crystallized in step (2), is 2 or greater, preferably 3 or greater, more preferably 5 or greater, more preferably 10 or greater, and even more preferably more preferably 15 or greater.
11. The process of any of embodiments 1 to 10, wherein the seed crystals comprise one or more zeolitic materials comprising $YO_2$ and $X_2O_3$, obtainable and/or obtained, preferably obtained from an organotemplate-free synthetic process, wherein Y is a tetravalent element, and X is a trivalent element.
12. The process of any of embodiments 1 to 11, wherein the seed crystals provided in step (1) comprise one or more zeolitic materials having a framework structure selected from the group consisting of LEV, BEA, MFI, ERI, and combinations of two or more thereof, wherein preferably the one or more zeolitic materials comprised in the seed crystals have an LEV and/or a BEA framework structure, more preferably an LEV or a BEA framework structure.
13. The process of embodiment 12, wherein the one or more zeolitic materials comprised in the seed crystals having an LEV framework structure comprise one or more zeolites selected from the group consisting of Levyne, LZ-132, NU-3, RUB-1, SAPO-35, ZK-20, ZSM-45, RUB-50, and mixtures of two or more thereof, wherein more preferably the one or more zeolitic materials having an LEV framework structure comprise RUB-50, and wherein even more preferably the zeolitic material having an LEV framework structure comprised in the seed crystals is RUB-50.
14. The process of embodiment 12, wherein the one or more zeolitic materials comprised in the seed crystals having a BEA framework structure comprises one or more zeolites selected from the group consisting of zeolite Beta, [B—Si—O]-BEA, [Ga—Si—O]-BEA, [Ti—Si—O]-BEA, Al-rich beta, CIT-6, Tschernichite, and mixtures of two or more thereof, preferably one or more zeolites selected from the group consisting of zeolite Beta, Al-rich beta, and mixtures of two or more thereof, wherein more preferably the one or more zeolitic materials having a BEA framework structure comprise zeolite Beta, and wherein even more preferably the zeolitic material having a BEA framework structure comprised in the seed crystals is zeolite Beta.
15. The process of any of embodiments 1 to 14, wherein steps (1) and (2) are repeated one or more times, preferably 3 or more times, more preferably 5 or more times, more preferably 10 or more times, more preferably 15 or more times, more preferably 20 or more times, more preferably 50 or more times, and even more preferably 100 or more times.
16. The process of any of embodiments 1 to 15, wherein Y is selected from the group consisting of Si, Sn, Ti, Zr, Ge, and mixtures of two or more thereof, Y preferably being Si.
17. The process of any of embodiments 1 to 16, wherein X is selected from the group consisting of Al, B, In, Ga, and mixtures of two or more thereof, X preferably being Al and/or B, and more preferably being Al.
18. The process of any of embodiments 1 to 17, wherein the one or more sources for $YO_2$ comprises one or more silica and/or silicates, preferably silica and/or water glass, more preferably one or more of fumed silica, sodium and/or potassium silicate, more preferably fumed silica and/or 19. The process of any of embodiments 1 to 18, wherein the one or more sources for $X_2O_3$ comprises one or more aluminates, preferably sodium and/or potassium aluminate, and more preferably sodium aluminate, wherein even more preferably the source for $X_2O_3$ is sodium aluminate.
20. The process of any of embodiments 1 to 19, wherein the $YO_2:X_2O_3$ molar ratio of the mixture according to step (1) ranges from 0.5 to 300, preferably from 1 to 200, more preferably from 5 to 150, more preferably from 10 to 120, more preferably from 15 to 100, and even more preferably from 20 to 90.
21. The process of any of embodiments 1 to 20, wherein the amount of seed crystals in the mixture according to step (1) ranges from 0.01 to 30 wt.-% based on 100 wt.-% of $YO_2$ in the at least one source for $YO_2$, preferably from 0.1 to 20 wt.-%, more preferably from 0.5 to 10 wt.-%, more preferably from 1 to 8 wt.-%, more preferably from 2 to 6 wt.-%, and even more preferably from 3 to 5 wt.-%.
22. The process of any of embodiments 1 to 21, wherein the one or more solvents in the mixture according to step (1) comprise water, preferably distilled water, optionally addition to one or more organic solvents, preferably one or more alcohols, more preferably one or more alcohols selected from the group consisting of methanol, ethanol, propanol, and mixtures thereof, more preferably methanol and/or ethanol, and even more preferably ethanol.
23. The process of embodiment 22, wherein the $H_2O:YO_2$ molar ratio of the mixture according to step (1) ranges from 5 to 200, preferably from 10 to 100, more preferably from 15 to 50, and even more preferably from 20 to 40.
24. The process of any of embodiments 1 to 23, wherein the crystallization in step (2) involves heating of the mixture, preferably at a temperature ranging from 80 to 250° C., more preferably from 90 to 180° C., more preferably from 100 to 160° C., and even more preferably from 110 to 150° C.
25. The process of embodiment 24, wherein the crystallization in step (2) is conducted under solvothermal conditions, preferably under hydrothermal conditions.
26. The process of embodiment 24 or 25, wherein the crystallization in step (2) involves heating of the mixture for a period ranging from 5 to 200 h, more preferably from 20 to 160 h, more preferably from 60 to 140 h, and even more preferably from 100 to 130 h.
27. The process of any of embodiments 1 to 26, wherein the crystallization in step (2) involves agitating the mixture, preferably by stirring.
28. A synthetic organotemplate-free zeolitic material obtainable and/or obtained, preferably obtained according to the process of any of embodiments 1 to 27.
29. Use of an organotemplate-free zeolitic material according to embodiment 28 as a molecular sieve, catalyst, catalyst support, and/or as an adsorbent, wherein the organotemplate-free zeolitic material is preferably used as a molecular trap for organic compounds, as a catalyst and/or as a catalyst support.

DESCRIPTION OF THE DRAWINGS

The powder X-ray diffraction patterns displayed in the figures were recorded on a Bruker-AXS D8 Advance Series 2 X-ray diffractometer with monochromatic Cu K alpha-1 radiation. The diffraction data were collected using a SOL-XE energy dispersive X-ray detector. In the figures, the angle 2 theta in ° is shown along the abscissa and the intensities are plotted along the ordinate.

DETAILED DESCRIPTION

Figure 1A:
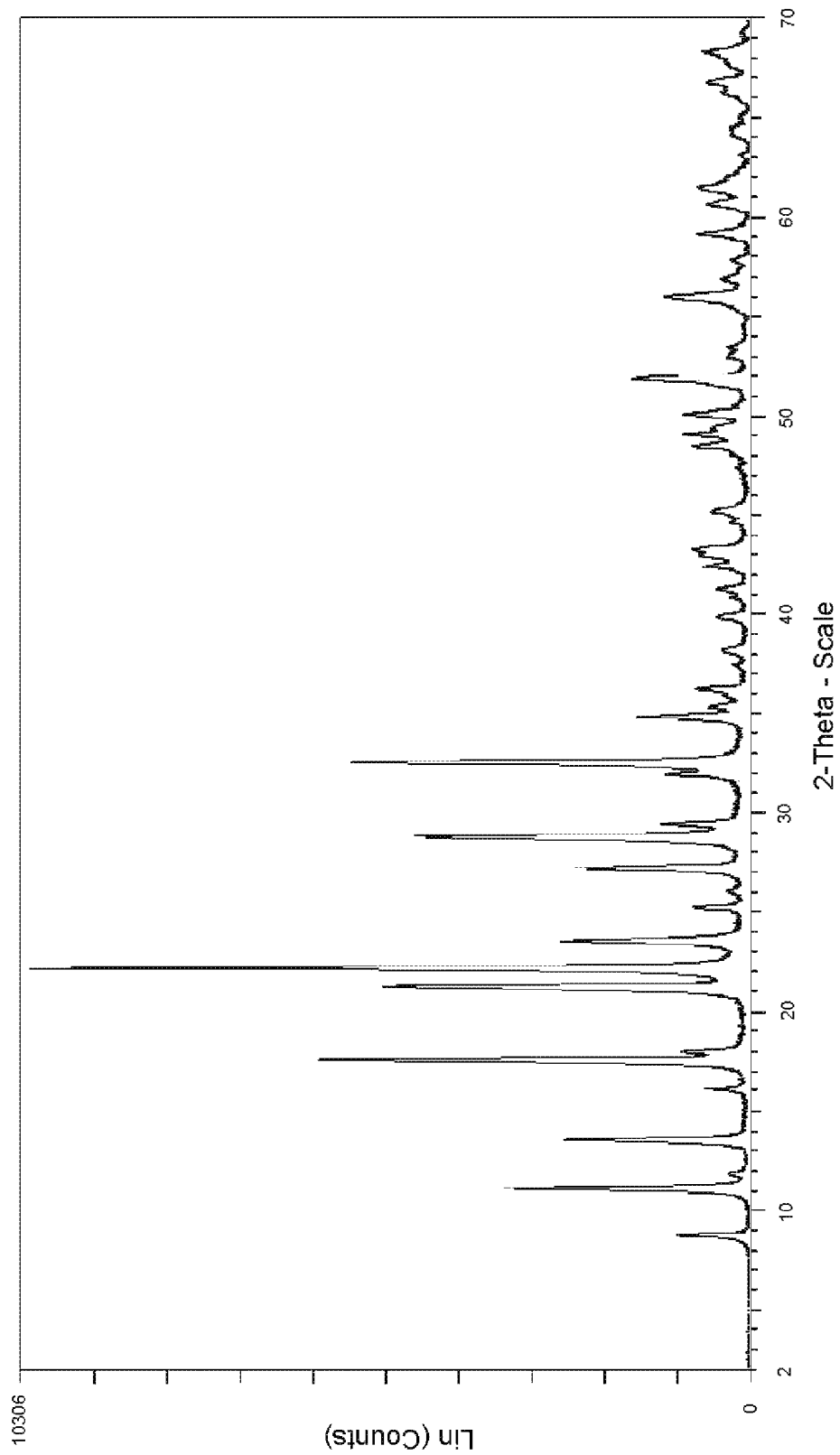
FIG. 1A shows the X-ray diffraction pattern of the RUB-50 seed crystals used in Example 1.

Accordingly, in one aspect, the present invention relates to an improved process for the organotemplate-free synthesis of a zeolitic material, in particular with respect to the yield of the organotemplate-free synthetic material. In view of said problem, it has surprisingly been found that by recycling at least a portion of the mother liquor obtained in an organotemplate-free synthetic process, the yield and in particular the overall yield may be improved without notably reducing the space-time yield in the production process.

Thus, it has quite unexpectedly been discovered that in the specific case of an organotemplate-free synthetic process, the mother liquor contained in the reaction product does not constitute a mere waste product but may far more actually be reused in the synthetic process for improving the overall yield without impairing the product characteristics, in particular with respect to the grade of crystallinity which may be achieved. More specifically, it has quite unexpectedly been found that compared to the conventional one-pot organotemplate-free synthetic processes using the same components in the same amounts as respectively employed in total in a process involving two or more crystallization steps and intermediate recycling of at least a portion of the mother liquor according to the present invention, the inventive process afford a product of comparable quality in considerably higher yields. As a result, it has surprisingly been found that an organotemplate-free synthetic process may be provided which avoids the disadvantages of the known processes, such that the highly useful zeolitic materials obtained from organotemplate free synthesis may be provided in an efficient and cost-effective manner such as to be able to actually compete with templated synthetic methodologies in terms of production costs. In particular, this is of decisive importance for actually realizing the environmentally friendly effects of organotemplate-free synthesis discussed in the foregoing which until now had been greatly impaired in view of the insufficient yields achieved in the organotemplate-free synthetic methodology.

Thus, the present invention concerns an organotemplate-free synthetic process for the production of a zeolitic material comprising $YO_2$ and $X_2O_3$, wherein said process comprises the steps of
(1) preparing a mixture comprising seed crystals, one or more sources for $YO_2$, one or more sources for $X_2O_3$, and one or more solvents;
(2) crystallizing the mixture obtained in step (1) to obtain a zeolitic material comprising $YO_2$ and $X_2O_3$ as a crystallization product;
wherein Y is a tetravalent element, and X is a trivalent element, and
wherein at least a portion of the mother liquor obtained in step (2) is recycled to step (1) as a source for $YO_2$, optionally after concentration of the mother liquor.

According to the inventive process, at no point does the mixture provided in step (1) and crystallized in step (2) contain more than an impurity of an organic structure directing agent specifically used in the synthesis of zeolitic materials comprising $YO_2$ and $X_2O_3$, in particular specific tetraalkylammonium salts and/or related organotemplates, and even more particularly not more than an impurity of tetraethylammonium, diethyldimethylammonium, and/or dibenzylmethylammonium salts, dibenzyl-1,4-diazabicyclo[2,2,2]octane, 1-methyl-1-azonia-4-azabicyclo[2.2.2]octane, and/or of the N-methylquinuclidinium cation. Such an impurity can, for example, be caused by organic structure directing agents still present in seed crystals used in the inventive process. Organotemplates contained in seed crystal material may not, however, participate in the crystallization process since they are trapped within the seed crystal framework and therefore may not act structure directing agents within the meaning of the present invention.

Within the meaning of the present invention, an "organotemplate-free" synthetic process relates to a synthetic process wherein the materials used therein are substantially free of organotemplate materials, wherein "substantially" as employed in the present invention with respect to the amount of one or more organotemplates contained in the one or more materials used in a synthetic process indicates an amount of 0.001 wt.-% or less of one or more organotemplates, preferably 0.0005 wt.-% or less, more preferably 0.00001 wt.-% or less, more preferably 0.000005 wt.-% or less, and even more preferably 0.000001 wt.-% or less thereof. Said amounts of one or more organotemplates, if at all present in any one of the materials used in the synthetic process, may also be denoted as "impurities" or "trace amounts" within the meaning of the present invention. Furthermore, it is noted that the terms "organotemplate" and "organic structure directing agent" are synonymously used in the present application.

The term "organotemplate" as employed in the present application designates any conceivable organic material which is suitable for template-mediated synthesis of a zeolitic material, preferably of a zeolitic material having a framework structure selected from the group consisting of LEV, BEA, MFI, ERI, and combinations of two or more thereof, more preferably of a zeolitic material having an LEV and/or a BEA framework structure, more preferably of a zeolitic material having an LEV or a BEA framework structure, wherein even more preferably the organotemplate as employed in the present application designates any conceivable organic material which is suitable for template-mediated synthesis of zeolite Beta and or RUB-50. Such organotemplates include but are by no means limited to specific tetraalkylammonium salts and/or related organotemplates such as tetraethylammonium, diethyldimethylammonium, and/or dibenzylmethylammonium salts, whereby the organotemplates further include by way of example dibenzyl-1,4-diazabicyclo[2,2,2]octane, 1-methyl-1-azonia-4-azabicyclo[2.2.2]octane, and the N-methylquinuclidinium cation.

The term "zeolitic material" as used in the present invention generally to any zeolite containing material. According to a preferred meaning, the term zeolitic material refers to one or more zeolites. "Zeolites" as related to in the context of the present invention are crystalline compounds with well-ordered channel or cage structures containing micropores. The expression "micropore" as used in the context of the present invention corresponds to the definition given in "Pure Applied Chemistry" (1976), Vol. 45, p. 71 ff., in particular p. 79. According to this definition, micropores are pores with a pore diameter of less than 2 nm. The network of these zeolites is made of $YO_4$ and $XO_4$-tetrahedra that are bridged via shared oxygen bonds. An overview of the known structures can be found in, e.g., W. M. Meier and D. H. Olson in "Atlas of Zeolite Structure Types", Elsevier, 4th Ed., London 1996. In addition to micropores, the zeolitic materials according to the invention may also contain mesopores and/or macropores as well. According to a particularly preferred meaning of the present invention, the term "zeolite" refers to one or more aluminosilicate compounds, and the term "zeolitic material" accordingly to a material containing one or more zeolites, and more preferably to the one or more zeolites themselves.

Furthermore, in the zeolitic material which may be obtained according to the inventive process, $YO_2$ and $X_2O_3$ are comprised in the framework structure of the zeolitic material as structure building elements, as opposed to non-framework elements which can be present in the pores and/or cavities formed by the framework structure and typical for zeolitic materials in general.

Within the meaning of the present invention, the term "mother liquor" designates the liquid phase of the reaction mixture obtained from step (2) in which solid materials, and in particular the zeolitic material comprising $YO_2$ and $X_2O_3$, is contained in the form of a solid residue and/or as suspended particles. According to a particularly preferred meaning of the present invention, the term "mother liquor" refers to the liquid phase of the reaction mixture obtained immediately of crystallization in step (2), which has either not been subject to any treatment or has optionally been concentrated prior to the recycling of at least a portion thereof to step (1). In particular, according to a preferred meaning of the present invention, a "treatment of the mother liquor" only refers to the liquid phase and not to the solids contained in the reaction mixture together with the mother liquor, such that an optional step of separating at least a portion of the solid material contained in the reaction mixture from the mother liquor preferably does not constitute a treatment of the mother liquor itself. More specifically, according to the present invention, it is preferred that the term "mother liquor" only refers to the liquid phase of the reaction mixture obtained from step (2) and does not include any solid matter equally contained in the reaction mixture, wherein the term "solid matter" principally designates any matter in the solid phase, and in particular a solid residue and/or suspended particles contained in the reaction mixture.

According to one embodiment of the present invention, a zeolitic material is crystallized in step (2). Said material comprises $YO_2$, wherein Y stands for any conceivable tetravalent element, Y standing for either one or several tetravalent elements. Preferred tetravalent elements according to the present invention include Si, Sn, Ti, Zr, and Ge, and combinations of two or more thereof. More preferably, Y stands for Si, Ti, or Zr, or any combination of said tetravalent elements, even more preferably for Si and/or Sn. According to the present invention, it is particularly preferred that Y stands for Si.

Thus, according to certain preferred embodiments of the present invention, Y is selected from the group consisting of Si, Sn, Ti, Zr, Ge, and mixtures of two or more thereof, Y more preferably being Si.

Furthermore, according to one embodiment of the process of the present invention one or more sources for $YO_2$ can be provided in step (1) in any conceivable form, provided that a zeolitic material comprising $YO_2$ can be crystallized in step (2). Preferably, $YO_2$ is provided as such and/or as a compound which comprises $YO_2$ as a chemical moiety and/or as a compound which (partly or entirely) is chemically transformed to $YO_2$ during the inventive process.

In certain preferred embodiments of the present invention, wherein Y stands for Si or for a combination of Si with one or more further tetravalent elements, the source for $SiO_2$ preferably provided in step (1) can be any conceivable source. There can therefore be used, for example, all types of silica and/or silicates, preferably fumed silica, silica hydrosols, reactive amorphous solid silicas, silica gel, silicic acid, water glass, sodium metasilicate hydrate, sesquisilicate or disilicate, colloidal silica, pyrogenic silica, silicic acid esters, or tetraalkoxysilanes, or mixtures of at least two of these compounds. According to particularly preferred embodiments of the inventive process, the one or more sources for $SiO_2$ comprise silica and/or water glass, more preferably one or more of fumed silica, sodium and/or potassium silicate. It is yet further preferred that the one or more sources for $SiO_2$ comprise fumed silica and/or sodium silicate, wherein according to particularly preferred embodiments the source for $SiO_2$ is silica and/or sodium silicate.

Therefore, it may be preferred according to the present invention that the one or more sources for $YO_2$ comprises one or more silica and/or silicates, more preferably silica and/or water glass, more preferably one or more of fumed silica, sodium and/or potassium silicate, more preferably fumed silica and/or sodium silicate, wherein even more preferably the source for $YO_2$ is silica and/or sodium silicate.

In some particularly preferred embodiments of the inventive process, wherein the mixture according to step (1) comprises one or more sources for $SiO_2$, said source preferably comprises silica, wherein more preferably fumed silica is preferred. According to further embodiments which are particularly preferred, the one or more sources for $SiO_2$ provided in step (1) comprises one or more silicates in addition to silica, preferably one or more alkali metal silicates and silica, more preferably water glass and colloidal silica, more preferably sodium and/or potassium silicate and colloidal silica, and even more preferably sodium silicate and colloidal silica.

According to certain embodiments of the present invention, the zeolitic material crystallized in step (2) further comprises $X_2O_3$, wherein X stands for any conceivable trivalent element, X standing for either one or several trivalent elements. Preferred trivalent elements according to the present invention include Al, B, In, and Ga, and combinations thereof. More preferably, X stands for Al, B, or In, or any combination of said trivalent elements, even more preferably for Al and/or B. According to the present invention, it is particularly preferred that X stands for Al.

Thus, according to certain embodiments of the inventive process, also one or more sources for $X_2O_3$ are provided in step (1). In general, $X_2O_3$ can be provided in any conceivable form, provided that a zeolitic material comprising $X_2O_3$ can be crystallized in step (2). Preferably, $X_2O_3$ is provided as such and/or as a compound which comprises $X_2O_3$ as a chemical moiety and/or as a compound which (partly or entirely) is chemically transformed to $X_2O_3$ during the inventive process.

In certain preferred embodiments of the present invention, wherein X stands for Al or for a combination of Al with one or more further trivalent elements, the source for $Al_2O_3$ provided in step (1) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises at least one compound selected from the group consisting of alumina and aluminates, preferably aluminates, more preferably alkali metal aluminates, wherein even more preferably, the alkali metal of the aluminate comprises one or more of the alkali metals M. Among the preferred alkali metal aluminates, the at least one source preferably comprises sodium and/or potassium aluminate, more preferably sodium aluminate. In particularly preferred embodiments of the present invention, the source for $Al_2O_3$ is sodium aluminate.

According to certain further preferred embodiments of the present invention wherein X stands for B or for a combination of B with one or more further trivalent elements, the source for $B_2O_3$ provided in step (1) can again be any conceivable source. By way of example, free boric acid and/or borates and/or boric esters may be provided as the source for $B_2O_3$, such as, for example, triethyl borate or trimethyl borate.

According to certain particularly preferred embodiments of the inventive process, the mixture according to step (1) comprises at least one silica as a source for $YO_2$ and at least one aluminate as a source for $X_2O_3$, more preferably at least one fumed silica and/or at least one alkali metal aluminate, wherein the alkali metal of said preferred embodiments preferably comprises sodium and/or potassium, more preferably sodium, and wherein the alkali metal even more preferably is sodium. According to further embodiments of the inventive process which are particularly preferred, the mixture according to step (1) comprises one or more silica in addition to one or more silicate as a source for $YO_2$ and at least one aluminate as a source for $X_2O_3$, preferably one or more alkali metal silicates, silica, and one or more alkali metal aluminates, more preferably water glass, colloidal silica, and sodium and/or potassium silicate, more preferably sodium and/or potassium silicate, colloidal silica, and sodium silicate, and even more preferably sodium silicate, colloidal silica, and sodium silicate.

Therefore, it is preferred according to certain embodiments of the present invention that the one or more sources for $X_2O_3$ comprises one or more aluminates, preferably sodium and/or potassium aluminate, and more preferably sodium aluminate, wherein even more preferably the source for $X_2O_3$ is sodium aluminate.

In general, according to certain embodiments of the present invention, the $YO_2$:$X_2O_3$ molar ratio of the mixture provided in step (1) can have any conceivable value, provided that a zeolitic material comprising both $YO_2$ and $X_2O_3$ is crystallized in step (2). Generally, the molar ratio ranges anywhere from 0.5 to 300. According to the present invention it is however preferred that the $YO_2$:$X_2O_3$ molar ratio of the mixture provided in step (1) is comprised in the range of from 1 to 200, more preferably of from 5 to 150, more preferably of from 10 to 120, and even more preferably or from 15 to 100. It is particularly preferred according to the inventive process that the $YO_2$:$X_2O_3$ molar ratio of the mixture provided in step (1) is comprised in the range of from 20 to 90.

Thus, according to preferred embodiments of the present invention, the $YO_2$:$X_2O_3$ molar ratio of the mixture according to step (1) ranges from 0.5 to 300, preferably from 1 to 200, more preferably from 5 to 150, more preferably from 10 to 120, more preferably from 15 to 100, and even more preferably from 20 to 90.

According to particularly preferred embodiments of the present invention, the $YO_2$:$X_2O_3$ molar ratio of the mixture according to step (1) is comprised in the range of from 40 to 150, more preferably of from 50 to 120, more preferably of from 60 to 100, and even more preferably or from 70 to 85. Alternatively, according to further embodiments of the inventive process which are particularly preferred, the $YO_2$:$X_2O_3$ molar ratio of the mixture according to step (1) is comprised in the range of from 5 to 65, more preferably of from 10 to 50, more preferably of from 15 to 40, more preferably of from 20 to 30, and even more preferably or from 23 to 25.

In embodiments of the present invention which are further preferred, the zeolitic material obtained and/or obtainable and/or the inventive material as such according to the inventive process comprises at least on alkali metal M, preferably sodium and/or potassium, and more preferably sodium. The alkali metal can be added at any conceivable stage of the inventive process, wherein preferably it is also added in step (1). More preferably, the entire quantity of the alkali metal comprised in the zeolitic material comprising $YO_2$ and $X_2O_3$ obtained in step (2) is added in step (1) of the inventive process. In particularly preferred embodiments of the inventive process, the alkali metal is partly or entirely contained in the one or more sources for $YO_2$ and/or $X_2O_3$ provided in step (1), preferably in the at least one source for $X_2O_3$. According to alternative embodiments of the present invention which are particularly preferred, the alkali metal and preferably sodium is entirely contained in both the one or more sources for $YO_2$ and in the one or more sources for $X_2O_3$.

According to certain embodiments of the process of the present invention, the mixture provided in step (1) can contain one or more sources for hydroxide anions OH—. In general any conceivable source for OH— can be used, wherein the at least one source preferably comprises a metal hydroxide, more preferably a hydroxide of an alkali metal M, more preferably sodium and/or potassium hydroxide, and even more preferably sodium hydroxide. In preferred embodiments of the inventive process, wherein the mixture comprises a silicate as a source for $YO_2$ and/or an aluminate as a source for $X_2O_3$, it is particularly preferred that the mixture does not contain a source for OH—, and in particular does not contain a hydroxide, preferably a metal hydroxide, more preferably a hydroxide of an alkali metal M, more preferably sodium and/or potassium hydroxide, and even more preferably does not contain sodium hydroxide.

According to certain embodiments of the process of the present invention, seed crystals are provided in step (1), wherein said seed crystals preferably comprise one or more zeolitic materials. Thus, in general, any conceivable type of seed crystals may be provided in step (1) of the inventive process provided that a zeolitic material comprising $YO_2$ and $X_2O_3$ is obtained as a crystallization product in step (2). According to a particularly preferred embodiment of the present invention, the seed crystals provided in step (1) comprise a zeolitic material, preferably a zeolitic material comprising $YO_2$ and $X_2O_3$, wherein more preferably the zeolitic material comprising $YO_2$ and $X_2O_3$ is obtainable and/or obtained, preferably obtained from an organotemplate-free synthetic process, and preferably according to the inventive process.

Thus, it is preferred according to the present invention that the seed crystals comprise one or more zeolitic materials comprising $YO_2$ and $X_2O_3$, obtainable and/or obtained, preferably obtained from an organotemplate-free synthetic process.

According to certain of the preferred embodiments of the present invention wherein the seed crystals comprise one or more zeolitic materials, there is again no general restriction as to the number and type of zeolites which may be contained therein. Thus, in principle, zeolites with any conceivable type of zeolite framework structure may be contained in the seed crystals, wherein zeolites having a framework structure selected from the group consisting of LEV, BEA, MFI, ERI, and combinations of two or more thereof are preferred. According to further preferred embodiments, the one or more zeolitic materials comprised in the seed crystals have an LEV and/or a BEA framework structure, wherein it is particularly preferred that the one or more zeolitic materials comprised in the seed crystals have an LEV or a BEA framework structure.

Therefore, according to certain preferred embodiments of the present invention, the seed crystals provided in step (1) comprise one or more zeolitic materials having a framework structure selected from the group consisting of LEV, BEA, MFI, ERI, and combinations of two or more thereof, wherein preferably the one or more zeolitic materials comprised in the seed crystals have an LEV and/or a BEA framework structure, more preferably an LEV or a BEA framework structure.

According to those embodiments of the present invention wherein the seed crystals comprise one or more zeolitic materials having an LEV framework structure, there is no particular restriction as to the number and type of zeolitic materials having an LEV framework structure which may be contained therein, provided that a zeolitic material comprising $YO_2$ and $X_2O_3$ as a crystallization product may be obtained in step (2). Thus by way of example, the one or more zeolites having an LEV framework structure comprised in the seed crystals may be selected from the group consisting of Levyne, LZ-132, NU-3, RUB-1, SAPO-35, ZK-20, ZSM-45, RUB-50, and mixtures of two or more thereof. According to particularly preferred embodiments thereof, the one or more zeolitic materials having an LEV framework structure comprise RUB-50, wherein even more preferably the zeolitic material having an LEV framework structure comprised in the seed crystals is RUB-50.

Alternatively, according to those embodiments of the present invention wherein the seed crystals comprise one or more zeolitic materials having a BEA framework structure, there is again no particular restriction as to the number and type of zeolitic materials having a BEA framework structure which may be contained therein, provided that a zeolitic material comprising $YO_2$ and $X_2O_3$ as a crystallization product may be obtained in step (2). Thus by way of example, the one or more zeolites having a BEA framework structure comprised in the seed crystals may be selected from the group consisting of zeolite Beta, [B—Si—O]-BEA, [Ga—Si—O]-BEA, [Ti—Si—O]-BEA, Al-rich beta, CIT-6, Tschernichite, and mixtures of two or more thereof. According to particularly preferred embodiments thereof, the one or more zeolitic materials having a BEA framework structure comprise one or more zeolites selected form the group consisting of zeolite Beta, Al-rich beta, and mixtures of two or more thereof, wherein it is preferred that the one or more zeolitic materials having a BEA framework structure comprise zeolite Beta, the zeolitic material having a BEA framework structure comprised in the seed crystals even more preferably being zeolite Beta.

According to certain embodiments of the inventive process, any suitable amount of seed crystals can be provided in the mixture according to step (1), provided that a zeolitic material comprising $YO_2$ and $X_2O_3$ is crystallized in step (2). Thus, by way of example, the amount of seed crystals contained in the mixture according to step (1) may range anywhere from 0.01 to 30 wt.-% based on 100 wt.-% of $YO_2$ contained in the at least one source for $YO_2$ provided in step (1). According to the present invention it is however preferred that the amount of seed crystals provided in step (1) ranges from 0.1 to 20 wt.-% based on 100 wt.-% of $YO_2$ contained in the at least one source for $YO_2$, wherein more preferably the amount of seed crystals ranges from 0.5 to 10 wt.-%, more preferably from 1 to 8 wt.-%, and more preferably from 2 to 6 wt.-%. According to particularly preferred embodiments of the present invention, the amount of seed crystals is comprised in the range of from 3 to 5 wt.-%

Therefore, it is preferred according to certain embodiments of the inventive process that the amount of seed crystals in the mixture according to step (1) ranges from 0.01 to 30 wt.-% based on 100 wt.-% of $YO_2$ in the at least one source for $YO_2$, preferably from 0.1 to 20 wt.-%, more preferably from 0.5 to 10 wt.-%, more preferably from 1 to 8 wt.-%, more preferably from 2 to 6 wt.-%, and even more preferably from 3 to 5 wt.-%.

In step (1) according to certain embodiments of the present invention, the mixture can be prepared by any conceivable means, wherein mixing by agitation is preferred, preferably by means of stirring.

According to certain embodiments of the present invention, the mixture according to step (1) of the inventive process further comprises one or more solvents. In this respect, any conceivable solvents may be used in any conceivable amount, provided that a zeolitic material comprising $YO_2$ and $X_2O_3$ can be crystallized in step (2). Preferably, the one or more solvents used comprise water, and more preferably distilled water. According to particularly preferred embodiments, the one or more solvents comprise water, preferably distilled water, in addition to one or more organic solvents, preferably one or more alcohols, more preferably one or more alcohols selected from the group consisting of methanol, ethanol, propanol, and mixtures thereof, more preferably methanol and/or ethanol, and even more preferably ethanol. According to said particularly preferred embodiments, it is further preferred that based on 100 wt.-% of the water and the one or more organic solvent components comprised in the solvent, said aqueous mixture contains from 0.05 to 50 wt.-% of the one or more organic solvents, preferably from 0.1 to 25 wt.-%, more preferably from 0.5 to 10 wt.-%, more preferably from 1 to 5 wt.-%, and even more preferably from 2 to 4 wt.-%. According to alternative embodiments which are particularly preferred, only water and preferably only distilled water is contained in the mixture according to step (1) as the solvent.

Thus, according to preferred embodiments of the present invention, the one or more solvents in the mixture according to step (1) comprise water, preferably distilled water, optionally addition to one or more organic solvents, preferably one or more alcohols, more preferably one or more alcohols selected from the group consisting of methanol, ethanol, propanol, and mixtures thereof, more preferably methanol and/or ethanol, and even more preferably ethanol.

As regards the one or more solvents which are provided in the mixture according to step (1), any suitable amount thereof may be used in the mixture, provided that a zeolitic material comprising $YO_2$ and $X_2O_3$ can be crystallized in step (2). Thus, by way of example, the $H_2O:YO_2$ molar ratio of the mixture provided in step (1), wherein $YO_2$ stands fro the molar amount of $YO_2$ contained in the at least one source for $YO_2$ provided in step (1), may range anywhere from 5 to 200. According to the present invention it is however preferred that the $H_2O:YO_2$ molar ratio of the mixture ranges from 10 to 100, wherein more preferably the molar ratio is comprised in the range of from 15 to 50. According to particularly preferred embodiments, the $H_2O:YO_2$ molar ratio of the mixture provided in step (1) ranges from 20 to 40.

It is accordingly preferred in certain embodiments of the inventive process that the $H_2O:YO_2$ molar ratio of the mixture according to step (1) ranges from 5 to 200, preferably from 10 to 100, more preferably from 15 to 50, and even more preferably from 20 to 40.

Among certain preferred embodiments of the present invention, it is further preferred that the $H_2O:YO_2$ molar ratio of the mixture provided in step (1) is comprised in the range of from 25 to 50, preferably of from 30 to 40, and even more preferably of from 33 to 37. Alternatively, it is further preferred according to the inventive process that the $H_2O:YO_2$ molar ratio of the mixture is comprised in the range of from 15 to 30, preferably of from 17 to 25, and even more preferably of from 20 to 22.

In certain preferred embodiments of the process of the present invention, the mixture according to step (1) further comprises at one or more sources of one or more elements suitable for isomorphous substitution of at least a portion of the Y atoms and/or of the X atoms in the framework structure of the zeolitic material crystallized in step (2). In general, any conceivable elements can be used provided that they may effectively be substituted into the zeolite framework structure via isomorphous substitution. In preferred embodiments, the one or more elements are selected from the group consisting of B, Fe, Ti, Sn, Ga, Ge, Zr, V, Nb, Cu, Co, Cr, Ni, Zn, Li, Be, and combinations of two or more thereof, wherein it is further preferred that the one or more elements are selected from the group consisting of Ti, Cu, Fe, and combinations of two or more thereof. According to particularly preferred embodiments wherein the mixture according to step (1) comprises one or more elements suitable for isomorphous substitution, said one or more elements comprise Fe and/or Cu, wherein preferably the one or more elements are Fe and/or Cu.

Therefore, in certain aspects, the present invention relates to a one-pot synthetic procedure for the preparation of an organotemplate-free zeolitic material comprising $YO_2$ and $X_2O_3$, wherein preferably the organotemplate-free zeolitic material is isomorphously substituted, said isomorphous substitution not being achieved by conventional processes involving the post-synthetic treatment of an existing framework, wherein framework elements are treated such that they may be replaced with other atoms which are then contained in the resulting framework structure. In particular, according to the inventive process it is not necessary to remove existing framework atoms for producing an isomorphously substituted framework structure.

In general, according to step (1) of the inventive process, the molar ratio of $YO_2$, wherein $YO_2$ stands for the molar amount of $YO_2$ contained in the at least one source for $YO_2$ provided in step (1), to the element or to the sum of the one or more elements suitable for isomorphous substitution can have any conceivable value, wherein the molar ratio preferably ranges from 3 to 300, preferably from 10 to 200, more preferably from 30 to 150, more preferably from 40 to 100, and even more preferably from 50 to 90.

In general, the single components for providing the mixture of step (1) of the inventive process can be added in any order, provided that a zeolitic material comprising $YO_2$ and $X_2O_3$ is crystallized from the mixture of step (1) in step (2). This may, for example, involve the addition of the solvent and the at least one source for $X_2O_3$ followed by the addition of the at least one source for $YO_2$, wherein the seed crystals are only added to the mixture afterwards. Alternatively, the addition of the solvent and of the at least one source for $X_2O_3$ may be first followed by the addition of the seed crystals, wherein the at least one source for $YO_2$ is only added thereafter. The at least one source of at least one element suitable for isomorphous substitution optionally present in the mixture provided in step (1) may also be added at any point, provided that a zeolitic material having an isomorphously substituted framework structure with respect to Y and/or with respect to X is crystallized from the mixture in step (2).

In general, step (2) according to certain embodiments of the inventive process can be conducted in any conceivable manner, provided that a zeolitic material comprising $YO_2$ and $X_2O_3$ is crystallized from the mixture according to step (1).

The mixture can be crystallized in any type of vessel, wherein a means of agitation is optionally employed, preferably by rotation of the vessel and/or stirring, and more preferably by stirring the mixture. According to the inventive process, crystallization in step (2) may also be conducted under static conditions.

According to certain embodiments of the inventive process, the mixture is preferably heated during at least a portion of the crystallization process in step (2). In general, the mixture can be heated to any conceivable temperature of crystallization, provided that a zeolitic material comprising $YO_2$ and $X_2O_3$ is crystallized from the mixture. Thus, by way of example the mixture in step (2) may be heated to a temperature ranging anywhere from 80 to 250° C. According to the invention it is however preferred that the temperature be comprised in the range of from 90 to 180° C., and more preferably in the range of from 100 to 160° C. According to particularly preferred embodiments, the crystallization process in step (2) involves heating the mixture to a temperature comprised in the range of from 110 to 150° C.

Thus, according to certain embodiments of the inventive process it is preferred that the crystallization in step (2) involves heating of the mixture, preferably at a temperature ranging from 80 to 250° C., more preferably from 90 to 180° C., more preferably from 100 to 160° C., and even more preferably from 110 to 150° C.

The heating in step (2) of the inventive process can be conducted in any conceivable manner suitable for the crystallization of a zeolitic material comprising $YO_2$ and $X_2O_3$. In general, heating may be conducted at one temperature of crystallization or vary between different temperatures. Preferably, a heat ramp is used for reaching the temperature of crystallization, wherein the heating rate preferably ranges from 10 to 100° C./h, more preferably from 20 to 70° C./h, more preferably from 25 to 60° C./h, more preferably from 30 to 50° C./h, and even more preferably from 35 to 45° C./h.

In certain preferred embodiments of the present invention, the mixture according to step (1) is subjected in step (2) to a pressure which is elevated with regard to normal pressure. The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

In embodiments of the inventive process wherein a solvent is present in the mixture according to step (1), it is preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises water, preferably distilled water, heating in step (2) is accordingly preferably conducted under hydrothermal conditions.

Therefore, according to the present invention embodiments are preferred wherein the crystallization in step (2) is conducted under solvothermal conditions, preferably under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used, wherein a Teflon-lined apparatus is preferred.

In general, the duration of the crystallization process in step (2) of the inventive process is not particularly limited, provided that a zeolitic material comprising $YO_2$ and $X_2O_3$ may be obtained as a crystallization product in step (2). In preferred embodiments involving heating of the mixture according to step (1), said crystallization process is preferably conducted for a period ranging from 5 to 200 h, wherein more preferably the duration of heating ranges from 20 to 160 h, more preferably from 60 to 140 h, and even more preferably from 100 to 130 h. Alternatively, according to particularly preferred embodiments of the present invention, and in particular according to particular and preferred embodiments of the present invention wherein the one or more zeolitic materials comprised in the seed crystals provided in step (1) have a BEA framework structure, the duration of heating in step (2) preferably ranges from 12 to 30 h, more preferably from 15 to 25 h, and even more preferably from 18 to 20 hours. According to said particularly preferred embodiments wherein the seed crystals comprise one or more zeolitic materials having a BEA framework structure it is further preferred that the heating of the mixture is conducted at a temperature comprised in the range of from 125 to 160° C., more preferably of from 130 to 150° C., and even more preferably of from 135 to 145° C.

According to certain preferred embodiments of the present invention, wherein the mixture is heated in step (2), said heating may be conducted during the entire crystallization process or during only one or more portions thereof, provided that a zeolitic material comprising $YO_2$ and $X_2O_3$ is crystallized. Preferably, heating is conducted during the entire duration of crystallization.

In general, the process of the present invention can optionally comprise further steps for the work-up and/or further physical and/or chemical transformation of the zeolitic material comprising $YO_2$ and $X_2O_3$ is crystallized in step (2) from the mixture provided in step (1). The crystallized material can for example be subject to any sequence of isolation and/or washing procedures and/or drying procedures and/or calcination procedures and/or ion-exchange procedures, wherein the zeolitic material obtained from crystallization in step (2) is preferably subject to at least one isolation and at least one washing procedure. Within the meaning of the present invention, the term "isolation" refers to a separation of the zeolitic material, and therefore refers to a "separation" or to a step of "separating" as defined in the present invention.

Therefore, it is preferred according to certain embodiments of the present invention that the inventive process further comprises one or more of the following steps of (3) separating at least a portion of the zeolitic material from the mother liquor obtained in step (2).

In step (3) of the certain embodiments of the inventive process, the zeolitic material may be separated from the mother liquor by any conceivable means, wherein by way of example any means of filtration, ultrafiltration, diafiltration, centrifugation and/or decantation methods may be employed including combinations of two or more thereof. Furthermore, the filtration methods can involve suction and/or pressure filtration steps. According to particularly preferred embodiments of the present invention, the separation in step (3) comprises one or more filtration steps, wherein more preferably the separation in step (3) is achieved by filtration.

Thus, according to certain embodiments of the present invention further comprising a step (3) of separating at least a portion of the zeolitic material from the mother liquor in step (2), it is further preferred that the zeolitic material or a portion thereof is separated from the mother liquor by one or more steps of filtration, centrifugation and/or decantation methods, and preferably by one or more filtration steps.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the separated zeolitic material is washed until the pH of the washing agent, preferably the washwater, is in the range of from 6 to 8, preferably from 6.5 to 7.5, as determined via a standard glass electrode.

Furthermore, the inventive process can optionally comprise one or more drying steps. In general, any conceivable means of drying can be used. Drying procedures preferably include heating and/or applying vacuum to the zeolitic material comprising $YO_2$ and $X_2O_3$. In envisaged embodiments of the present invention, one or more drying steps may involve spray drying, preferably spray granulation of the zeolitic material.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, and even more preferably of from 12 to 24 h.

According to certain embodiments of the inventive process, the zeolitic material crystallized in step (2) can optionally be subject to at least one step of an ion-exchange procedure, wherein the term "ion-exchange" according to the present invention generally refers to non-framework ionic elements and/or molecules contained in the zeolitic material. Preferably, the non-framework ionic element comprises one or more of the one or more alkali metals M preferably comprised in the zeolitic material comprising $YO_2$ and $X_2O_3$ obtained from step (2).

In general, any conceivable ion-exchange procedure with all possible ionic elements and/or molecules can be conducted on the zeolitic material, with the exception of organic structure directing agents specifically used in the synthesis of zeolitic materials comprising $YO_2$ and $X_2O_3$, in particular specific tetraalkylammonium salts and/or related organotemplates, and even more particularly not more than an impurity of tetraethylammonium, tiethyldimethylammonium, and/or dibenzylmethylammonium salts, dibenzyl-1,4-diazabicyclo [2,2,2]octane, 1-methyl-1-azonia-4-azabicyclo[2.2.2]octane, and/or of the N-methylquinuclidinium cation. Preferably, as ionic elements at least one cation and/or cationic element is employed which is preferably selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, and even more preferably from the group consisting of $H^+$, $NH_4^+$, Fe, Cu, and mixtures of two or more thereof.

Preferably, the zeolitic material is first ion-exchanged with $H^+$ and/or $NH_4^+$, and more preferably with $NH_4^+$, before being subject to a further ion-exchange procedure, more preferably before being subject to ion-exchange with at least one cation and/or cationic element selected from the group consisting Sr, Zr, Cr, Fe, Co, Ni, Cu, Zn, Ru, Rh, Pd, Ag, Os, Ir, Pt, Au, and mixtures of two or more thereof, more preferably from the group consisting of Sr, Cr, Fe, Co, Ni, Cu, and mixtures of two or more thereof, wherein even more preferably the at least one cation and/or cationic element comprises or preferably consists of Cu and/or Fe.

In general, the optional separation and/or washing and/or drying and/or calcination and/or ion-exchange procedures comprised in the inventive process can be conducted in any conceivably order and repeated one or more times.

Therefore, according to certain embodiments of the invention further comprising a step (3) of separating at least a portion of the zeolitic material from the mother liquor in step (2), the inventive process preferably further comprises one or more of the following steps of (4) washing the zeolitic material, and/or (5) drying and/or calcinating the zeolitic material, and/or (6) subjecting the zeolitic material to one or more ion-exchange procedures, wherein the steps (4) and/or (5) and/or (6) can be conducted in any order, wherein one or more of said steps is preferably repeated one or more times.

Preferably, in certain embodiments, the inventive process comprises at least one step (3) of separating at least a portion of the zeolitic material crystallized according to step (2) from the mother liquor, more preferably by filtration thereof. According to the inventive process it is further preferred that after the at least one step of isolating, the zeolitic material is subject to at least one step of drying, wherein more preferably the zeolitic material is subject to at least one step of washing prior to the at least one drying step. In a particularly preferred embodiment, the zeolitic material crystallized according to step (2) is subject to at least one step (3) of separating at least a portion of the zeolitic material from the mother liquor, followed by at least one step of washing, and then followed by at least one step of drying.

According to a further embodiment of the inventive process which is alternatively preferred, at least a portion of the zeolitic material crystallized in step (2) is directly subject to at least one step of drying, preferably to spray drying and/or spray granulation, without isolating, washing, or drying of the zeolitic material beforehand. Directly subjecting at least a portion of the mixture obtained from step (2) of the inventive process to a spray drying or spray granulation stage has the advantage that isolation and drying is performed in a single stage. Consequently, according to this embodiment of the present invention, an even more preferred process is provided wherein the number of post-synthesis workup steps is minimized, as a result of which the organotemplate-free zeolitic material comprising $YO_2$ and $X_2O_3$ can be obtained from a highly simplified process. It will, however, be understood that according to further preferred embodiments wherein the entire reaction mixture obtained in step (2) is directly subject to at least one step of drying, preferably by spray drying or spray granulation, without isolating, washing, or drying of the zeolitic material beforehand, said particular embodiments preferably include one or more previous sequences of steps of providing a mixture according to step (1) and crystallizing the mixture obtained in step (1) according to step (2) of the inventive process, wherein at least a portion of the mother liquor obtained in said one or more previous steps (2) has been recycled to step (1).

According to a yet further embodiment of the present invention, the zeolitic material obtained from crystallization in step (2) is subject to at least one isolating step prior to being subject to at least one ion-exchange procedure, preferably to at least one isolating step followed by at least one washing step, and more preferably to at least one isolating step followed by at least one washing step followed by at least one drying step prior to being subject to at least one ion-exchange procedure.

In certain embodiments of the process of the present invention, it is preferred that a calcination step is not employed. In general, a calcination step involves the heating of the zeolitic material crystallized according to step (2) above a temperature of 500° C. More preferably, a process according to the present invention for the production of a zeolitic material comprising $YO_2$ and $X_2O_3$ which does not comprise a calcination step refers to processes, wherein the zeolitic material crystallized according to step (2) is not subject in a subsequent step to a temperature exceeding 450° C., more preferably 350° C., more preferably 300° C., more preferably 250° C., more preferably 200° C., and even more preferably 150° C. According to certain embodiments of the present invention it is particularly preferred that after completion of step (2) of the inventive process, wherein the crystallized zeolitic material is at ambient temperature, said material is subsequently not subject to any heating process normally or suitably conducted for removal of organotemplates form a zeolitic material comprising $YO_2$ and $X_2O_3$. Within the meaning of the present invention, a zeolitic material which is "non-calcined" is one which has not been subject to any one of the aforementioned calcination procedures.

In general, the zeolitic material obtained according to the inventive process may be any conceivable zeolite comprising $YO_2$ and $X_2O_3$. According to preferred embodiments, the zeolitic material comprising $YO_2$ and $X_2O_3$ formed in step (2) comprises one or more zeolites having a framework structure selected from the group consisting of LEV, BEA, MFI, ERI, and combinations of two or more thereof, wherein preferably the zeolitic material comprises one or more zeolites having an LEV and/or a BEA framework structure, and even more preferably having an LEV or a BEA framework structure.

According to certain embodiments of the present invention wherein the zeolitic material comprising $YO_2$ and $X_2O_3$ formed in step (2) comprises one or more zeolites having an LEV framework structure, there is no particular restriction as to the number and type of zeolitic materials having an LEV framework structure which may be contained therein. Thus by way of example, the one or more zeolites having an LEV framework structure comprised in the zeolitic material formed in step (2) may be selected from the group consisting of Levyne, LZ-132, NU-3, RUB-1, SAPO-35, ZK-20, ZSM-45, RUB-50, and mixtures of two or more thereof. According to particularly preferred embodiments thereof, the one or more zeolitic materials having an LEV framework structure comprised in the zeolitic material formed in step (2) comprise RUB-50, wherein even more preferably the zeolitic material formed in step (2) is RUB-50.

Alternatively, according to certain preferred embodiments of the present invention wherein the zeolitic material comprising $YO_2$ and $X_2O_3$ formed in step (2) comprises one or more zeolites having a BEA framework structure, there is again no particular restriction as to the number and type of zeolitic materials having a BEA framework structure which may be contained therein. Thus by way of example, the one or more zeolites having a BEA framework structure comprised in the zeolitic material formed in step (2) may be selected from the group consisting of zeolite Beta, [B—Si—O]-BEA, [Ga—Si—O]-BEA, [Ti—Si—O]-BEA, Al-rich beta, CIT-6, Tschernichite, and mixtures of two or more thereof. According to particularly preferred embodiments thereof, the one or more zeolitic materials having a BEA framework structure comprised in the zeolitic material formed in step (2) comprise one or more zeolites selected form the group consisting of zeolite Beta, Al-rich beta, and mixtures of two or more thereof, wherein it is preferred that the one or more zeolitic materials having a BEA framework structure comprise zeolite Beta, the zeolitic material formed in step (2) even more preferably being zeolite Beta.

According to certain embodiments of the inventive process, at least a portion of the mother liquor obtained in step (2) is recycled to step (1) as a source for $YO_2$. Thus, as noted in the foregoing, it has surprisingly been found that an organotemplate-free synthetic process for the production of a zeolitic material comprising $YO_2$ and $X_2O_3$ may be considerably improved, in particular with respect to it's overall yield, by recycling at least a portion of the mother liquor obtained from step (2) as a source for $YO_2$ in step (1), wherein steps (1) and (2) are accordingly repeated thereafter at least once. This is based on the highly unexpected finding that, depending on the number of repetitions, the quality of the mother liquor obtained in step (2) is such that it may actually be recycled and thus reused in an organotemplate-free synthetic process for the production of a zeolitic material comprising $YO_2$ and $X_2O_3$.

Within the meaning of the present invention, the term "overall yield" generally relates to the yield of the organotemplate-free zeolitic material based on the amount of $YO_2$ contained in the one or more sources for $YO_2$ respectively provided in step (1). In particular, according to the present invention, the term "overall yield" preferably refers to a sequence of steps (1) and (2) which are repeated one or more times, such that at least a portion of the mother liquor obtained in step (2) is recycled to step (1) and is therefore comprised among the one or more sources for $YO_2$ provided in said subsequent step (1).

Furthermore, within the meaning of the present invention, the term "recycling" refers to any means by which at least a portion of the mother liquor obtained in step (2) is used or reused in an organotemplate-free synthetic process for the production of a zeolitic material according to steps (1) and (2) of the inventive process. In this respect, said term as such implies no particular restriction regarding the state or composition of the mother liquor which is used of reused.

Thus, according to certain embodiments of the inventive process, the mother liquor obtained in step (2) may either be partly or entirely recycled to step (1) of an organotemplate-free synthetic process for the production of a zeolitic material comprising $YO_2$ and $X_2O_3$, wherein the mother liquor may be subject to one or more steps (3) of separating at least a portion of the zeolitic material obtained in step (2) therefrom, and/or wherein the mother liquor may be concentrated prior to being recycled to step (1). According to particular embodiments of the present invention wherein both a separation step (3) and a concentration step are performed, there is no particular restriction as to the number and/or the order of said steps, provided that the mother liquor recycled to step (1) is suited for crystallizing a zeolitic material comprising $YO_2$ and $X_2O_3$ when used in the mixture provided in said step (1). Thus, the reaction mixture obtained in step (2) may first be concentrated and subsequently subjected to one or more separation steps (3) prior to being recycled to step (1). Alternatively, the reaction mixture obtained in step (2) may first be subject to one or more separation steps (3), after which the mother liquor separated in this fashion is concentrated in one or more concentration steps. Thus according to said particular embodiments, the steps of separation (3) and concentration may be conducted in any order, wherein one or both of said steps may be repeated one or more times.

As regards certain particularly preferred embodiments of the inventive process comprising a step of concentrating the mother liquor obtained from step (2) prior to its recycling to step (1), principally any suitable concentration method may be employed, provided that it allows for increasing the concentration of the solutes in the mother liquor, and in particular of the one or more sources for $YO_2$ dissolved therein. Thus, in principle, any concentration method may be employed, provided that it allows for the removal of at least a portion of the one or more solvents contained in the mother liquor. By way of example, any suitable distillation process optionally involving a heating of the mother liquor and/or the application of vacuum may be employed for achieving the desired grade of concentration, wherein said distillation process may comprise one or more individual distillation steps.

According to certain embodiments of the present invention it is preferred that, besides the mother liquor or a portion thereof, at least a portion of the zeolitic material obtained in step (2) is also recycled to step (1) of an organotemplate-free synthetic process for the production of a zeolitic material comprising $YO_2$ and $X_2O_3$ for use or reuse as seed crystals therein. As for the recycling of the mother liquor, the term "recycling" within the meaning of the present invention as used with respect to a recycling of at least a portion of the zeolitic material refers to any means by which at least a portion of the zeolitic material obtained in step (2) is used or reused in an organotemplate-free synthetic process for the production of a zeolitic material according to steps (1) and (2) of the inventive process. As regards the means by which the zeolitic material is recycled to step (1), no particular restriction applies according to the present invention, provided that the recycled zeolitic material may serve as seed crystals for preparing a mixture according to step (1), from which according to step (2) a zeolitic material comprising $YO_2$ and $X_2O_3$ may be crystallized. Thus, according to particular embodiments, the zeolitic material obtained in step (2) may be directly recycled to step (1) without any further step or treatment thereof.

Therefore, according to certain preferred embodiments of the inventive process, zeolitic material obtained in step (2) or a portion thereof is directly recycled to step (1) as seed crystals, wherein preferably the zeolitic material obtained in step (2) or a portion thereof is directly recycled to step (1) as seed crystals.

Alternatively, the zeolitic material to be recycled may first be subject to one or more steps of (3) separating at least a portion of the zeolitic material from the mother liquor obtained in step (2). In particular, the same preferred and particularly preferred embodiments apply with respect to a step (3) conducted with respect to the zeolitic material to be recycled to step (1) as generally described in the foregoing with respect to the work-up and/or further physical and/or chemical transformation of the zeolitic material comprising $YO_2$ and $X_2O_3$ crystallized in step (2) from the mixture provided in step (1).

Thus, according to further preferred embodiments of the present invention the zeolitic material obtained in step (2) or a portion thereof is recycled to step (1) as seed crystals after the step or steps of (3) separating at least a portion of the zeolitic material from the mother liquor obtained in step (2),
(4) washing the zeolitic material, and/or
(5) drying and/or calcinating the zeolitic material, wherein preferably the zeolitic material is recycled as seed crystals after having been subject to step (3) followed by steps (4) and/or (5), more preferably followed by steps (4) and (5), and even more preferably followed by step (4).

As for the separation step (3) preferably conducted with respect to the zeolitic material to be recycled to step (1), the same preferred and particularly preferred embodiments also apply with respect to one or more steps (4) and/or (5) conducted with respect to the zeolitic material to be recycled to step (1) as generally described in the foregoing with respect to the work-up and/or further physical and/or chemical transformation of the zeolitic material comprising $YO_2$ and $X_2O_3$ crystallized in step (2) from the mixture provided in step (1). Thus, according to yet further preferred embodiments, after having separated the zeolitic material to be recycled from the mother liquor, said separated zeolitic material is subject to one or more washing steps and furthermore to one or more drying and/or calcination steps, preferably to one or more washing steps and to one or more drying steps, wherein even more preferably, the separated zeolitic material to be recycled is subject to one or more washing steps after having been separated from the mother liquor and prior to being recycled to step (1) as seed crystals. In particular, it is further preferred according to the present invention that after having separated at least a portion of the zeolitic material obtained in step (2) from the mother liquor, the separated zeolitic material or a portion thereof is recycled to step (1) as seed crystals after having been subject to one or more steps (4) and/or (5), more preferably to one or more steps (4) and (5), more preferably to one or more steps (4).

Alternatively, according to further preferred embodiments of the present invention, the reaction mixture obtained in step (2) or a portion thereof may be directly recycled to step (1), wherein said reaction mixture comprises both the zeolitic material obtained from crystallization in step (2) as well as the mother liquor.

In embodiments wherein only a portion of the reaction mixture obtained in step (2) is recycled to step (1), there is no particular restriction as to the amount of mother liquor and zeolitic material which are contained in the portion of the reaction mixture which is recycled to step (1). Thus the weight or molar ratios of the zeolitic material to the components of the mother liquor in the portion of the reaction mixture recycled to step (1) may be essentially the same as in the reaction mixture obtained in step (2), from which said portion is taken. Alternatively, the weight or molar ratios of the portion of the reaction mixture recycled to step (1) may be different from the reaction mixture obtained in step (2) due to one or more steps (3) of separating a portion of the zeolitic material from the mother liquor obtained in step (2) and/or one or more steps of concentrating the mother liquor prior to the recycling of a portion of the reaction mixture obtained in step (2) to step (1).

Alternatively, the entire reaction mixture may be directly recycled to step (1) of an organotemplate-free synthetic process for the production of a zeolitic material comprising $YO_2$ and $X_2O_3$, wherein the reaction mixture may optionally be concentrated prior thereto. According to said particularly preferred embodiments involving directly recycling the entire reaction mixture obtained in step (2), the step of recycling preferably consists in providing one or more sources $X_2O_3$ to the reaction mixture obtained in step (2) for preparing a mixture comprising seed crystals, one or more sources for $YO_2$, one or more sources for $X_2O_3$, and one or more solvents according to step (1) of the inventive process. Alternatively, in addition to providing one or more sources $X_2O_3$ to the reaction mixture obtained in step (2), the direct recycling of the entire reaction mixture to step (1) of an organotemplate-free synthetic process for the production of a zeolitic material comprising $YO_2$ and $X_2O_3$ preferably includes optionally adding one or more additional sources for seed crystals and/or optionally adding one or more additional sources for $YO_2$ and/or optionally adding one or more solvents to the reaction mixture obtained in step (2), for providing a reaction mixture according to step (1), from which a zeolitic material comprising $YO_2$ and $X_2O_3$ as a crystallization product is obtained in step (2).

Therefore, according to certain embodiments of the present invention which are further preferred, at least a portion of the reaction mixture obtained from crystallization in step (2) is recycled to step (1) as seed crystals and as a source for $YO_2$.

Thus, according to particularly preferred embodiments of the present invention, the inventive process comprises a sequence of steps (1) and (2) of preparing and subsequently crystallizing a synthesis mixture according to any particular or preferred embodiment of the present invention as defined in the foregoing, adding one or more sources for $X_2O_3$ to the reaction mixture obtained in step (2), optionally adding one or more additional sources for seed crystals thereto and/or optionally adding one or more additional sources for $YO_2$ thereto and/or optionally adding one or more solvents thereto, for providing a mixture in accordance with step (1), and crystallizing according to step (2). In particular, it has surprisingly been found that by crystallizing a synthesis mixture provided in step (1) according to step (2) of the inventive process, replenishing the reaction mixture obtained from said crystallization step with at least with one or more sources for $X_2O_3$, and optionally with one or more sources seed crystals and/or with one or more sources for $YO_2$ and/or with one or more sources for $X_2O_3$, and/or with one or more solvents, such as to provide a new synthesis mixture according to step (1) including at least recycled mother liquor from the previous crystallization step (2), and subsequently crystallizing said new synthesis mixture according to step (2), the overall yield of the zeolitic material comprising $YO_2$ and $X_2O_3$ obtained from the repetition of steps (1) and (2) after mother liquor recycling may be considerably improved, in particular compared to a one-pot synthetic process using the same components in the same amounts as respectively employed in total in the inventive process.

According to the present invention, there is no particular restriction as to the amount of X in wt.-% which may be contained in the mother liquor obtained in step (2). It is, however, preferred in the present invention that the amount of X in wt.-% contained in the mother liquor obtained in step (2) is equal to 50% of less of the amount of X in wt.-% from the one or more sources for $X_2O_3$ contained in the mixture obtained in step (1) which was crystallized in step (2). In this respect, the amount of X in wt.-% contained in the mother liquor obtained in step (2) is based on 100 wt.-% of the mother liquor. Furthermore, the amount of X in wt.-% from the one or more sources for $X_2O_3$ contained in the mixture in step (1) which is crystallized in step (2) is based on 100 wt.-% of said synthesis mixture provided in step (1). According to said preferred embodiments, it is yet further preferred that the amount of X in wt.-% contained in the mother liquor obtained in step (2) is equal to 30% or less the amount of X in wt.-% from the one or more sources for $X_2O_3$ contained in the mixture obtained in step (1) crystallized in step (2), more preferably 20% or less, more preferably 15% or less, more preferably 10% or less, more preferably 8% or less, and more preferably 7% or less. According to particularly preferred embodiments thereof, the amount of X in wt.-% contained in the mother liquor obtained in step (2) is equal to 6% or less the amount of X in wt.-% from the one or more sources for $X_2O_3$ contained in the mixture obtained in step (1).

Therefore, according to certain preferred embodiments of the present invention, the amount of X in wt.-% contained in the mother liquor obtained in step (2), based on 100 wt.-% of the mother liquor, is equal to 50% or less of the amount of X in wt.-% from the one or more sources for $X_2O_3$ contained in the mixture obtained in step (1), based of 100 wt.-% of said mixture, which was crystallized in step (2), preferably 30% or less the amount, more preferably 20% or less, more preferably 15% or less, more preferably 10% or less, more preferably 8% or less, more preferably 7% or less, and even more preferably 6% or less.

Furthermore, as regards the composition of the mother liquor obtained in step (2), there is no particular restriction according to the inventive process as to the Y:X molar ratio which it displays. It is, however, preferred that compared to the Y:X molar ratio of the one or more sources for $YO_2$ and the one or more sources for $X_2O_3$ contained in the mixture obtained in step (1) and crystallized in step (2), the Y:X molar ratio of the mother liquor is only half as high or lower. Thus, it is preferred that ratio of the Y:X molar ratio of the mother liquor obtained in step (2) to the Y:X molar ratio of the one or more sources for $YO_2$ and the one or more sources for $X_2O_3$ contained in the mixture obtained in step (1) is 2 or greater, wherein more preferably said ratio is 3 or greater, more preferably 5 or greater, more preferably 10 or greater. According to further embodiments of the present invention which are particularly preferred, the ratio of the Y:X molar ratio of the mother liquor obtained in step (2) to the Y:X molar ratio of the one or more sources for $YO_2$ and the one or more sources for $X_2O_3$ contained in the mixture obtained in step (1) is 15 or greater.

According to the present invention, there is no particular restriction as to the number of times the synthesis mixture for the organotemplate-free synthesis may be crystallized, and the mother liquor obtained from said synthesis recycled to a new synthesis mixture for a subsequent crystallization step. Thus, there is no particular limitation as to the number of times the successive steps (1) and (2) may be repeated and the mother liquor obtained from step (2) recycled prior to the one or more repetitions. According to the present invention, a repetition of successive steps (1) and (2) indicates that steps (1) and (2) are conducted, after which at least a portion of the mother obtained from step (2) in said successive steps is recycled to a further step (1), after which a further step (2) is conducted, such that according to said example a single repetition of steps (1) and (2) is achieved. As regards steps (1) and (2) which are first conducted and subsequently repeated one or more times using at least a portion of the mother liquor from step (2) of the first or previous succession of steps, respectively, there is no particular restriction as to the embodiments for steps (1) and (2) which according to the present invention, and in particular according to particular and preferred embodiments as defined in the foregoing, may be employed, nor as to the combination of any particular or preferred embodiments for successive steps which may be employed therein as the first and/or on or more subsequent successive steps (1) and (2). As regards the number of times the successive steps (1) and (2) may be repeated according to the inventive process, by way of example, said successive steps may be repeated anywhere from one to 100 or more times, wherein preferably, the successive steps (1) and (2) are repeated 3 or more times, more preferably 5 or more times, more preferably 10 or more times, more preferably 15 or more times, more preferably 20 or more times, more preferably 50 or more times, and even more preferably 100 or more times.

Therefore, according to certain preferred embodiments of the present invention, the steps (1) and (2) of the inventive process are repeated one or more times, preferably 3 or more times, more preferably 5 or more times, more preferably 10 or more times, more preferably 15 or more times, more preferably 20 or more times, more preferably 50 or more times, and even more preferably 100 or more times.

According to particular embodiments of the present invention which are further preferred, the successive steps are repeated from 2 to 100 times, more preferably from 2 to 50 times, more preferably from 2 to 20 times, more preferably from 2 to 15 times, more preferably from 2 to 10 times, more preferably from 2 to 5 times, and even more preferably from 2 to 3 times. According to further embodiments which are particularly preferred, the successive steps (1) and (2) of the inventive process are repeated from 3 to 50 times, more preferably from 3 to 20 times, more preferably from 3 to 15 times, more preferably from 3 to 10 times, and even more preferably from 3 to 5 times. Yet further preferred embodiments involve a repetition of the successive steps (1) and (2) from 5 to 50 times, more preferably from 5 to 20 times, more preferably from 5 to 15 times, and even more preferably from 5 to 10 times.

In addition to these embodiments are further particularly preferred involving a repetition of from 10 to 50 times, and more preferably of from 15 to 20 times, wherein according to yet further preferred embodiments the successive steps (1) and (2) of the inventive process are repeated from 15 to 50 times.

In certain aspects, the present invention furthermore relates to a synthetic organotemplate-free zeolitic material comprising $YO_2$ and $X_2O_3$ which is either obtained by the process according to the present invention or by any conceivable process which leads to a zeolitic material comprising $YO_2$ and $X_2O_3$ as obtainable according to the inventive process. According to particularly preferred embodiments, the synthetic organotemplate-free zeolitic material comprising $YO_2$ and $X_2O_3$ is a non-calcined zeolitic material which is either obtained by the process according to the present invention or by any conceivable process which leads to a zeolitic material comprising $YO_2$ and $X_2O_3$ as obtainable according to the inventive process. Within the meaning of the present invention, a material which is designated as a "synthetic" material does not signify that the designated material as such may not naturally occur in nature. In particular, a "synthetic" material only indicates that it is man-made, but by no means excludes that the material as such may occur naturally. Therefore, by way of example, the present invention also relates to a synthetic Levyne. In this respect, it is herewith further noted that within the meaning of the present invention, the term "organotemplate-free zeolitic material" is synonymous to "synthetic organotemplate-free zeolitic material".

Therefore, in certain aspects, the present invention also relates to a synthetic organotemplate-free zeolitic material comprising $YO_2$ and $X_2O_3$ which is obtainable and/or obtained according to the inventive process.

Depending on the specific needs of its application, the inventive material can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, in certain aspects, the present invention also relates to a molding comprising the inventive zeolitic material.

In general, the powder or sprayed material can be shaped without any other compounds, e.g. by suitable compacting, to obtain moldings of a desired geometry, e.g. tablets, cylinders, spheres, or the like.

Preferably, in certain embodiments, the powder or sprayed material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

The zeolitic material of the present invention may therefore also be provided in the form of extrudates, pellets, tablets or particles of any other suitable shape, for use as a packed bed of particulate catalyst, or as shaped pieces such as plates, saddles, tubes, or the like.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promotors, or the like. Typically, the carrier comprises a member, often referred to as a "honeycomb" carrier, comprising one or more refractory bodies having a plurality of fine, parallel gas flow passages extending therethrough. Such carriers are well known in the art and may be made of any suitable material such as cordierite or the like.

In general, the zeolitic material described above can be used as molecular sieve, adsorbent, catalyst, catalyst support or binder thereof. For example, the zeolitic material can be used as molecular sieve to dry gases or liquids, for selective molecular separation, e.g. for the separation of hydrocarbons or amides; as ion exchanger; as chemical carrier; as adsorbent, in particular as adsorbent for the separation of hydrocarbons or amides; or as a catalyst. Most preferably, the zeolitic material according to the present invention is used as a catalyst and/or as a catalyst support.

According to a preferred embodiment of the present invention, the organotemplate-free zeolitic material of the invention is used in a catalytic process, preferably as a catalyst and/or catalyst support, and more preferably as a catalyst. In general, the zeolitic material of the invention can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond. In particularly preferred embodiments of the present invention, the zeolitic material is used as a catalyst and/or catalyst support in a fluid catalytic cracking (FCC) process.

According to a further embodiment of the present invention, the zeolitic material of the invention is preferably used in a catalytic process involving the conversion of at least one compound comprising at least one nitrogen-oxygen bond. Particularly preferred according to the present invention is the use of the zeolitic material comprising $YO_2$ and $X_2O_3$ as a catalyst and/or catalyst support in a selective catalytic reduction (SCR) process for the selective reduction of nitrogen oxides $NO_x$; for the oxidation of $NH_3$, in particular for the oxidation of $NH_3$ slip in diesel systems; for the decomposition of $N_2O$. The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$). According to particularly preferred embodiments of the present invention, the organotemplate-free zeolitic material used in a catalytic process involving the conversion of at least one compound comprising at least one nitrogen-oxygen bond comprises Cu and/or Fe, and more preferably Cu.

Therefore, in certain aspects, the present invention also relates to a method for selectively reducing nitrogen oxides $NO_x$ by contacting a stream containing $NO_x$ with a catalyst containing the zeolitic material comprising $YO_2$ and $X_2O_3$ according to the present invention under suitable reducing conditions; to a method of oxidizing $NH_3$, in particular of oxidizing $NH_3$ slip in diesel systems, by contacting a stream containing $NH_3$ with a catalyst containing the zeolitic material comprising $YO_2$ and $X_2O_3$ according to the present invention under suitable oxidizing conditions; to a method of decomposing of $N_2O$ by contacting a stream containing $N_2O$ with a catalyst containing the zeolitic material comprising $YO_2$ and $X_2O_3$ according to the present invention under suitable decomposition conditions; to a method of controlling emissions in Advanced Emission Systems such as Homogeneous Charge Compression Ignition (HCCI) engines by contacting an emission stream with a catalyst containing the zeolitic material comprising $YO_2$ and $X_2O_3$ according to the present invention under suitable conditions; to a fluid catalytic cracking FCC process wherein the zeolitic material comprising $YO_2$ and $X_2O_3$ according to the present invention is employed as additive; to a method of converting an organic compound by contacting said compound with a catalyst containing the zeolitic material comprising $YO_2$ and $X_2O_3$ according to the present invention under suitable conversion conditions; to a "stationary source" process wherein a catalyst is employed containing the zeolitic material comprising $YO_2$ and $X_2O_3$ according to the present invention.

Therefore, in certain aspects, the present invention also relates to a method for selectively reducing nitrogen oxides $NO_x$, wherein a gaseous stream containing nitrogen oxides $NO_x$, preferably also containing ammonia and/urea, is contacted with the zeolitic material according to the present invention or the zeolitic material obtainable of obtained according to the present invention, preferably in the form of a molded catalyst, still more preferably as a molded catalyst wherein the zeolitic material is deposited on a suitable refractory carrier, still more preferably on a "honeycomb" carrier.

The nitrogen oxides which are reduced using a catalyst containing the zeolitic material according to the present invention or the zeolitic material obtainable of obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Most preferably, the zeolitic material according to the present invention or the zeolitic material obtainable of obtained according to the present invention is used as a molded catalyst, still more preferably as a molded catalyst wherein the zeolitic material is deposited on a suitable refractory carrier, still more preferably on a "honeycomb" carrier, for the selective reduction of nitrogen oxides $NO_x$, i.e. for selective catalytic reduction of nitrogen oxides. In particular, the selective reduction of nitrogen oxides wherein the zeolitic material according to the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

Furthermore, it is preferred that the organotemplate-free zeolitic material is used as a molecular trap for organic compounds. In general, any type of organic compound may be trapped in the zeolitic material, wherein it is preferred that the compound is reversibly trapped, such that it may be later released from the zeolitic material, preferably wherein the organic compound is released—preferably without conversion thereof—by an increase in temperature and/or a decrease in pressure. Furthermore, it is preferred that the zeolitic material is used to trap organic compounds of which the dimensions allow them to penetrate the microporous system of the molecular structure. According to yet further embodiments of the present invention, it is preferred that the trapped compounds are released under at least partial conversion thereof to a chemical derivative and/or to a decomposition product thereof, preferably to a thermal decomposition product thereof.

When preparing specific catalytic compositions or compositions for different purposes, it is also conceivable to blend the zeolitic material according to the present invention comprising $YO_2$ and $X_2O_3$ with at least one other catalytically active material or a material being active with respect to the intended purpose. It is also possible to blend at least two different inventive materials which may differ in the $YO_2$:$X_2O_3$ ratio, preferably in the $SiO_2$:$Al_2O_3$ ratio, and/or in the presence or absence of one or more further metals such as one or more transition metals and/or in the specific amounts of a further metal such as a transition metal, wherein according to particularly preferred embodiments, the one or more transition metal comprises Cu and/or Fe, more preferably Cu. It is also possible to blend at least two different inventive materials with at least one other catalytically active material or a material being active with respect to the intended purpose.

Also, the catalyst may be disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention comprising $YO_2$ and $X_2O_3$ may be deposited on an open cell foam substrate. Such substrates are well known in the art, and are typically formed of refractory ceramic or metallic materials.

Especially preferred is the use of a catalyst containing the zeolitic material according to the present invention or the zeolitic material obtainable or obtained according to the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, in certain aspects, the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the present invention is employed as catalytically active material.

The present invention, in certain aspects, therefore relates to the use of the organotemplate-free zeolitic material of the invention, in particular in the field of catalysis and/or in the treatment of exhaust gas, wherein said exhaust gas treatment comprises industrial and automotive exhaust gas treatment. In these and other applications, the zeolitic material of the present invention can by way of example be used as a molecular sieve, catalyst, and/or catalyst support.

In embodiments of the present invention involving the use of the zeolitic material of the invention in exhaust gas treatment, the zeolitic material is preferably used in the treatment of industrial or automotive exhaust gas, more preferably as a molecular sieve in said applications. In a particularly preferred embodiment, the zeolitic material used in exhaust gas treatment is comprised in a hydrocarbon trap.

EXAMPLES

Example 1

Preparation of the RUB-50 Seed Crystals 13.09 kg of an aqueous solution having 20.62 wt-% diethyldimethylammonium hydroxide were weighed into a plastic container together with 91.4 g of sodium hydroxide which was dissolved therein under stirring. 356.7 g of aluminum hydroxide were then added under stirring and the resulting mixture stirred for an additional 10 min to afford a slightly cloudy solution. 2.74 kg of Aerosil 200 were then added in portions to the mixture which was then let to stir an additional 1 hour, thus affording 16.278 kg of a milky suspension.

The mixture was then transferred to an autoclave wherein 6.3 kg of water were distilled off at a temperature of 105° C. after which the concentrated mixture was subjected to hydrothermal conditions at 150° C. for 120 hours (5 days). The resulting suspension was centrifuged and the solid product washed with distilled water until a conductivity of the washing solution of less than 200 µS/cm³ was achieved. The resulting solid was then transferred to a porcelain receptacle and then dried therein at 120° C. for 16 hours, thus affording 807.6 g of a white powder.

Elemental analysis:
Si: 33 g/100 g
Al: 3.3 g/100 g
Na: 0.5 g/100 g
C: 10.8 g/100 g Therefore, according to our elemental analysis, the $SiO_2$:$Al_2O_3$:Na ratio of the product is approximately 19.32:1:0.36. Furthermore, it is apparent from the elemental analysis that the resulting zeolite material contains the organic template enclosed therein. The nitrogen isotherm obtained using the synthesized RUB-50 seed material did not afford a step-like curve of a type I adsorption isotherm of a microporous solid (see DIN 66135), indicating that the zeolite does not have open micropores due to the organic template material enclosed therein. The evaluation of the data gave an equivalent surface of 68.55 $m^2/g$ according to the Langmuir method, and a BET surface area of 50.20 $m^2/g$.

In FIG. 1A the XRD of the RUB-50 seed material is displayed, showing the typical pattern for the LEV-type zeolite framework structure.

Seed-Directed Synthesis of an LEV-Type Zeolite 1392.8 g of distilled water were weighed into a plastic beaker, together with 57.5 g of NaOH and 9.1 g of $NaAlO_2$. The mixture was then stirred for 30 min to afford a clear solution. 132.7 g of fumed silica (Aerosil 200) were then added in portions while stirring. 101.3 g of ethanol were then added and the mixture was stirred for 5 hours affording an alumina silicate gel with a molar ratio of $40SiO_2$:$1Al_2O_3$:$28Na$:$1407H_2O$:$40EtOH$. 6.6 g of the RUB-50 seed crystals were then added to the mixture which was stirred for an additional 5 min to afford a thick slurry having a pH of 13.5 as the reaction mixture.

The gel mixture was then transferred to an autoclave and crystallized at 120° C. for 120 hours (5 days). After having let the reaction mixture cool to room temperature, it was filtered over a glass frit. Elemental analysis of the mother liquor afforded the following values:

Si: 3.1 g/100 g
Al: <0.01 g/100 g
Na: 1.9 g/100 g
C: 2.4 g/100 g

Thus, the mother liquor obtained from the crystallization process contained no substantial amount of aluminum, which was depleted during the crystallization process. More specifically, compared to the synthesis mixture which contained 0.176 wt.-% of aluminum in the form of sodium aluminate used as the source for $Al_2O_3$, the mother liquor contained less than 0.01 wt.-% of aluminum, which amounts to less than 5.7% of the original amount of aluminum provided in the synthesis mixture as the source for $Al_2O_3$. In comparison, the synthesis mixture contained 3.64 wt.-% of silicon in the form of fumed silica used as the source for $SiO_2$, such that 85% of said silicon was still present in the mother liquor since it displayed a content of 3.1 wt.-% of Si.

Comparing the Si:Al molar ratio in the mother liquor which amounts to more than 299 to the Si:Al molar ratio contained in the synthesis mixture of about 20 calculated on the amount of Si and Al respectively contained in the fumed silica and sodium aluminate, the ratio of the Si:Al molar ratio in the mother liquor is accordingly more than about 15 times greater than the Si:Al molar ratio in the original synthesis mixture.

The solid residue separated from the mother liquor was washed with 4 l of distilled water. The solid product was then transferred to a porcelain receptacle and dried therein at 120° C. for 16 hours, thus affording 32.2 g of a white powder having a crystallinity grade of 96%, wherein the microcrystalline product displayed a mean diameter of the crystallites of 89 nm.

Figure 1B:
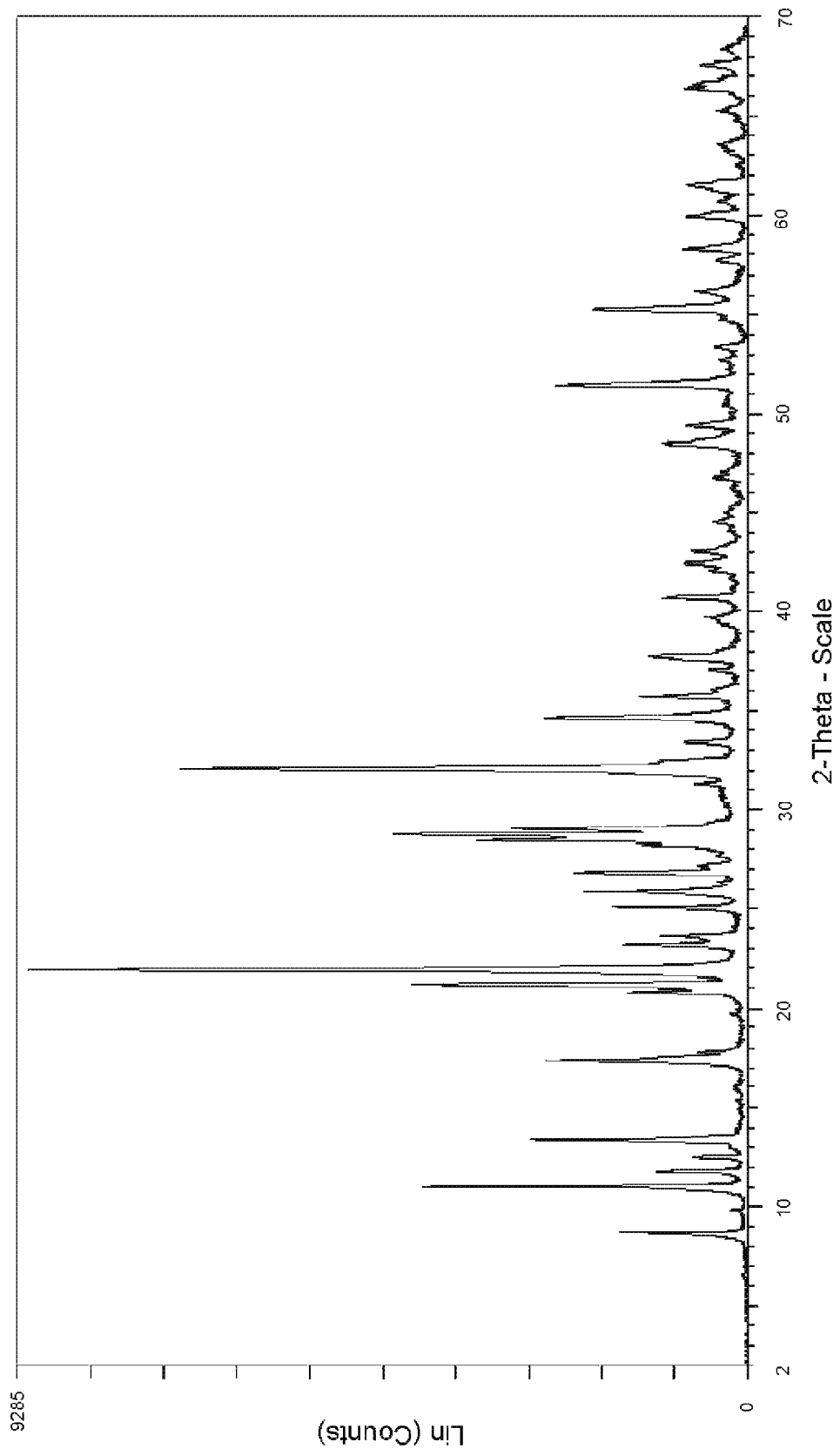
FIGS. 1B and 2A show the X-ray diffraction pattern of the crystalline material obtained from the initial seed-directed synthesis in Examples 1 and 2, respectively.

FIG. 1B shows the crystalline product obtained from the organotemplate-free synthesis. In particular, the XRD reflection pattern of the microcrystalline product reveals an LEV-type zeolite framework structure.

Based on a solid content of 1.89 wt.-% for the reaction mixture as obtained from crystallization, the space-time yield amounted to 3.8 $kg*m^{-3}*d^{-1}$.

Recycling of the Mother Liquor 522.5 g of distilled water were weighed into a plastic beaker, together with 41.0 g of NaOH and 9.0 g of $NaAlO_2$. The mixture was then stirred for 30 min to afford a clear solution. 982.1 g of the mother liquor obtained from the seed-directed synthesis were then added, and the yellowish solution was stirred for 5 min. 86.7 g of fumed silica (Aerosil 200) were then added in portions while stirring. 54.3 g of ethanol were then added and the mixture was stirred for 5 hours affording an alumina silicate gel. 6.6 g of the RUB-50 seed crystals were then added to the mixture which was stirred for an additional 5 min to afford a thick slurry having a pH of 13.3 as the reaction mixture.

The gel mixture was then transferred to an autoclave and crystallized at 120° C. for 120 hours (5 days). After having let the reaction mixture cool to room temperature, it was filtered over a glass frit and the solid residue was washed with 5.5 l of distilled water. The solid product was then transferred to a porcelain receptacle and dried therein at 120° C. for 16 hours, thus affording 30.2 g of a white crystalline powder.

Figure 1C:
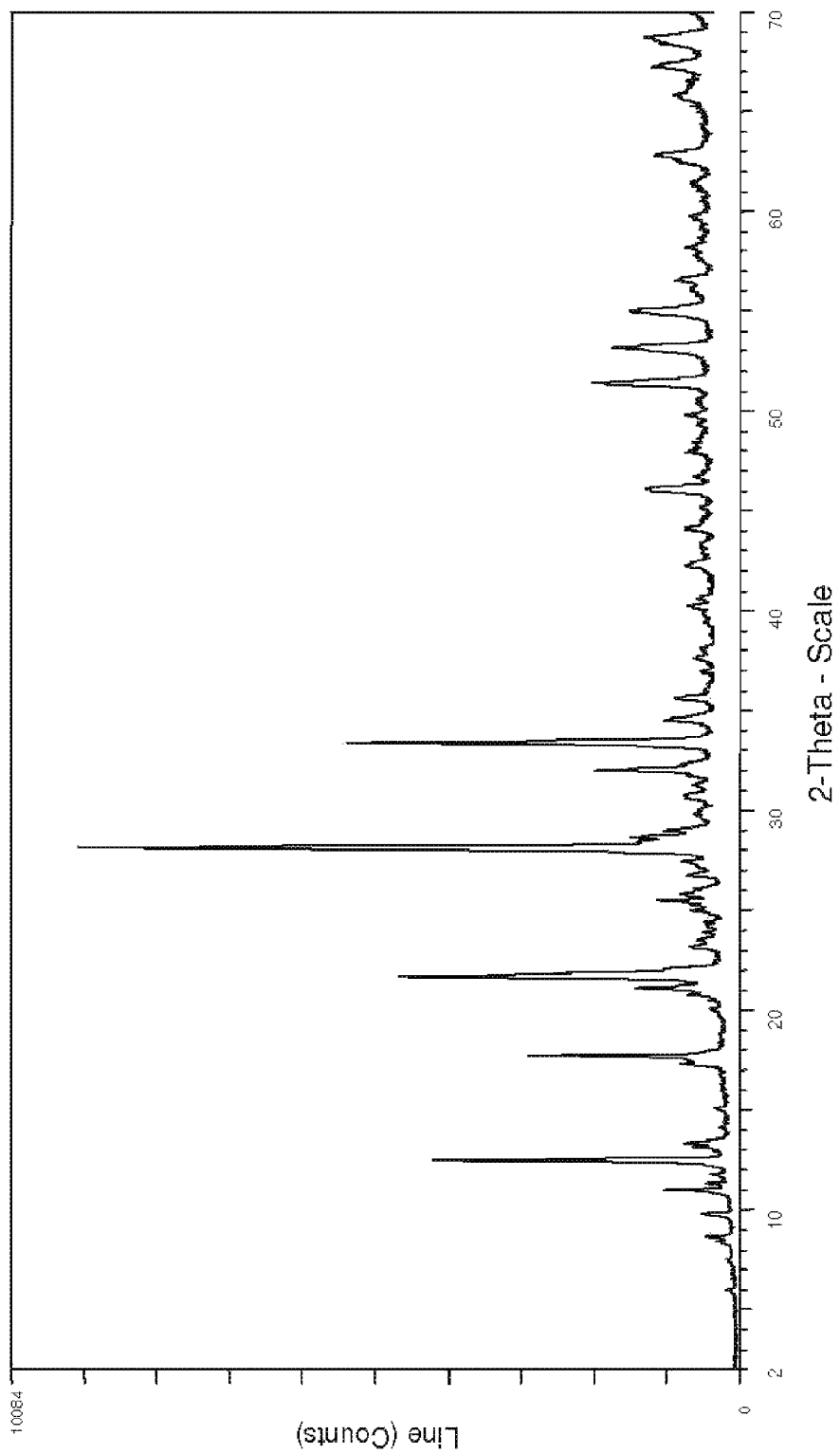
FIGS. 1C and 2B show the X-ray diffraction pattern of the crystalline material obtained from the seed-directed synthesis using recycled mother liquor in Examples 1 and 2, respectively.

FIG. 1C shows the crystalline product obtained from the organotemplate-free synthesis employing recycled mother liquor. In particular, the XRD reflection pattern of the microcrystalline product reveals an LEV-type zeolite framework structure.

Based on a solid content of 1.78 wt.-% for the reaction mixture as obtained from crystallization, the space-time yield amounted to 3.6 $kg*m^{-3}*d^{-1}$.

Accordingly, recycling of the mother liquor allowed for the further synthesis of zeolitic material having a crystallinity which is clearly comparable to the zeolitic material obtained in the first seed-directed synthesis in addition to affording a comparable space time yield. Thus it is shown that the mother liquor may be efficiently recycled in an organotemplate-free synthetic process for increasing the yield thereof, in particular based on the total amount of silica used therein as the source for $SiO_2$ contained in the zeolite product, without notably reducing the efficiency of the process, nor the quality of the zeolite material obtained from crystallization.

Example 2

Seed-Directed Synthesis of a BEA-Type Zeolite 88.89 g of distilled water were placed in a 250 ml Teflon® autoclave-receptacle, into which 4.11 g of $NaAlO_2$ were then dissolved. 0.9 g of Al-beta zeolite seed crystals (CP814C zeolite Beta from Zeolyst International) were added, after which 88.23 g of sodium-water glass solution (26 wt.-% $SiO_2$ and 8 wt.-% $Na_2O$; Woellner GmbH & Co. KG) was added in portions. Finally, 17.91 g of Ludox® AS-40 colloidal silica (40 wt.-%) were added, and the autoclave receptacle was placed into the respective autoclave, in which the mixture was then crystallized at 120° C. for 120 hours.

After having let the reaction mixture cool to room temperature, it was filtered over a glass frit. Elemental analysis of the mother liquor afforded the following values:

Si: 4.7 g/100 g
Al: 0.042 g/100 g
Na: 2.9 g/100 g

Thus, the mother liquor obtained from the crystallization process contained no substantial amount of aluminum, which was depleted during the crystallization process. More specifically, compared to the synthesis mixture which contained 0.675 wt.-% of aluminum in the form of sodium aluminate used as the source for $Al_2O_3$, the mother liquor only contained 0.042 wt.-% of aluminum, which amounts to 6.2% of the original amount of aluminum provided in the synthesis mixture as the source for $Al_2O_3$. In comparison, the synthesis mixture contained 7.02 wt.-% of silicon in the form of water glass and colloidal silica used as the source for $SiO_2$, such that 67% of said silicon was still present in the mother liquor since it displayed a content of 4.7 wt.-% of Si.

Comparing the Si:Al molar ratio in the mother liquor which amounts to around 108 to the Si:Al molar ratio contained in the synthesis mixture of around 10 calculated on the amount of Si and Al respectively contained in the water glass, colloidal silica, and in the sodium aluminate, the ratio of the Si:Al molar ratio in the mother liquor is accordingly about 11 times greater than the Si:Al molar ratio in the original synthesis mixture.

The solid residue separated from the mother liquor was repeatedly washed with distilled water until pH neutrality of the wash-water, after which it was dried at 120° C. for 16 h thus affording 17.2 g of a white crystalline product. The product displayed a crystallinity grade of 102% compared to the Al-beta zeolite seed crystals used in synthesis.

Figure 2A:
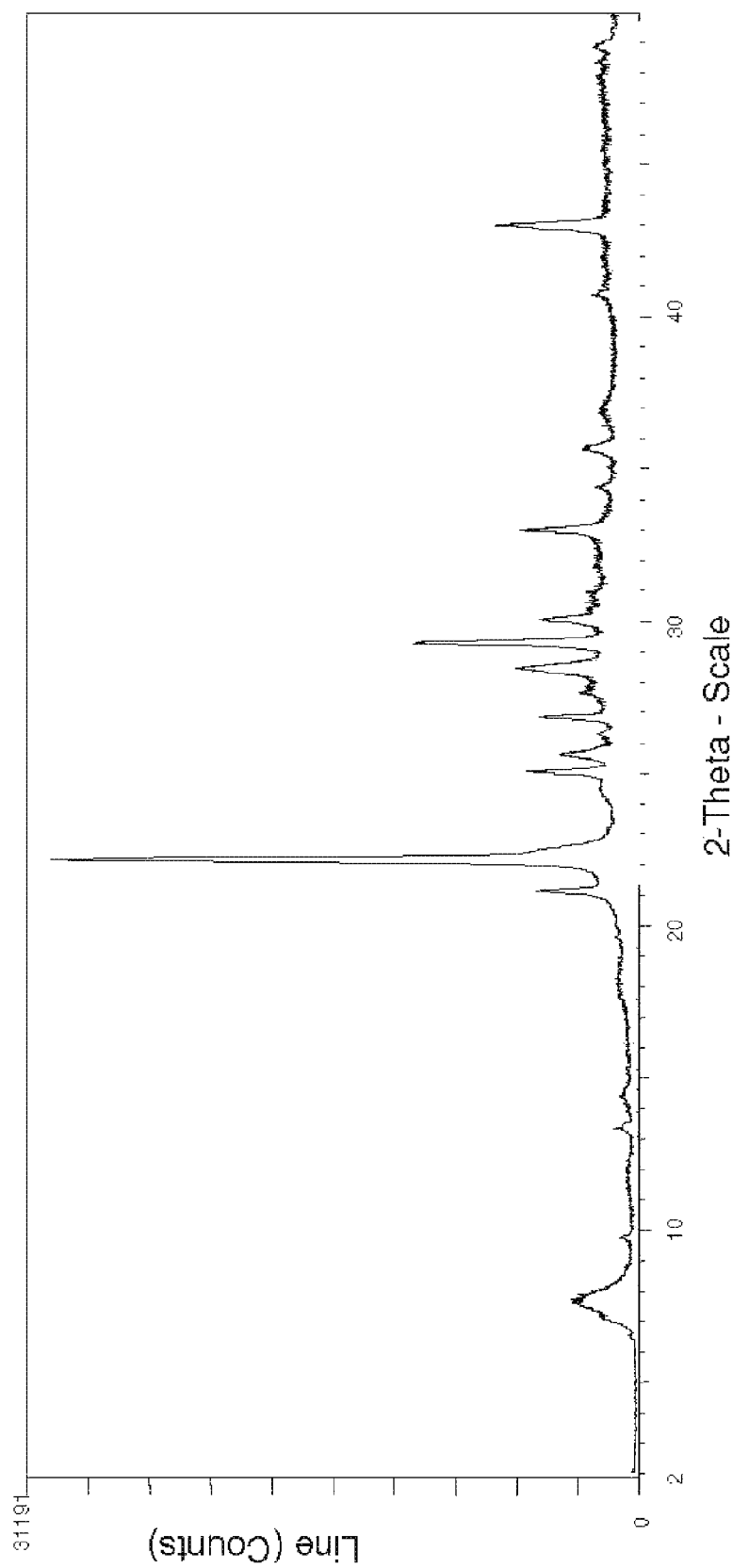

In FIG. 2A, the XRD of the washed and dried crystalline product obtained from hydrothermal synthesis is displayed. In particular, the XRD pattern is typical for a BEA framework structure.

Based on the solid content of the reaction mixture as obtained from crystallization, the space-time yield amounted to 20.24 kg*$m^{-3}$*$d^{-1}$.

Recycling of the Mother Liquor 119.56 g of the mother liquor obtained from the seed-directed synthesis were placed in a 250 ml Teflon® autoclave-receptacle, to which 0.9 g of Al-beta zeolite seed crystals (CP814C zeolite Beta from Zeolyst International) were stirred in. 4.09 g of $NaAlO_2$ dissolved in 19.82 g of distilled water were then added to the mixture, after which 30.65 g of sodium-water glass solution (26 wt.-% $SiO_2$ and 8 wt.-% $Na_2O$; Woellner GmbH & Co. KG) were added to the mixture in portions while stirring. Finally, 25.35 g of Ludox® AS-40 colloidal silica (40 wt.-%) were added, and the autoclave receptacle was placed into the respective autoclave, in which the mixture was then crystallized at 120° C. for 120 hours.

After having let the reaction mixture cool to room temperature, it was filtered over a glass frit and the solid residue was repeatedly washed with distilled water until pH neutrality of the wash-water, after which it was dried at 120° C. for 16 h thus affording 16.0 g of a white crystalline product. The product displayed a crystallinity grade of 97% compared to the Al-beta zeolite seed crystals used in synthesis.

Figure 2B:
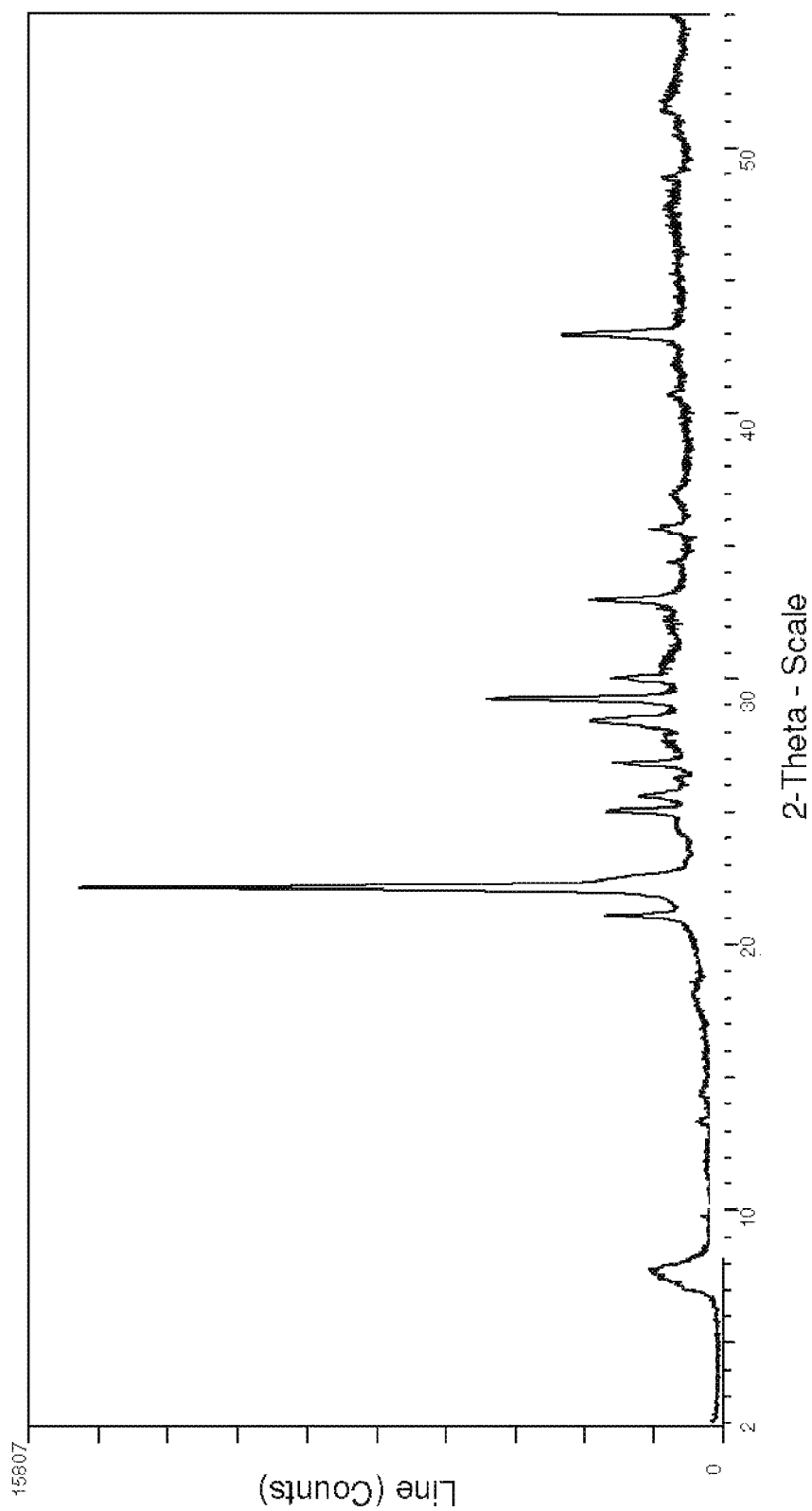

In FIG. 2B, the XRD of the washed and dried crystalline product obtained from hydrothermal synthesis is displayed. In particular, the XRD pattern is typical for a BEA framework structure.

Based on the solid content of the reaction mixture as obtained from crystallization, the space-time yield amounted to 18.82 kg*$m^{-3}$*$d^{-1}$.

Accordingly, considering the quality of the zeolite materials obtained in Example 2 and the space-time yields respectively attained therein, it is again demonstrated that the mother liquor of an organotemplate-free synthetic process for the production of a zeolite may be effectively recycled for increasing the overall yield thereof, in particular based on the total amount of silica used therein as the source for $SiO_2$ contained in the zeolite product.

Cited Prior Art Documents

U.S. Pat. No. 3,308,069
U.S. Pat. No. 4,554,145
U.S. Pat. No. 4,642,226
U.S. Pat. No. 7,264,789 B1
Yamamoto et al. Micropor. Mesopor. Mater. 2009, Vol. 128, pp. 150-157
Xie et al., Chem. Mater. 2008, 20, pp. 4533-4535 and Supporting Information
WO 2010/146156 A
Majano et al., Chem. Mater. 2009, 21, pp. 4184-4191
Xie et al., Chem. Commun. 2011, 47, pp. 3945-3947

The invention claimed is:

1. An organotemplate-free synthetic process for the production of a zeolitic material comprising $YO_2$ and $X_2O_3$, wherein said process comprises the steps of
   (1) preparing a mixture comprising seed crystals, one or more sources for $YO_2$, one or more sources for $X_2O_3$, and one or more solvents;
   (2) crystallizing the mixture obtained in step (1) to obtain a zeolitic material comprising $YO_2$ and $X_2O_3$ as a crystallization product;
wherein Y is a tetravalent element, and X is a trivalent element,
wherein at least a portion of the mother liquor obtained in step (2) is recycled to step (1) as a source for $YO_2$, optionally after concentration of the mother liquor, and
wherein the ratio of the Y:X molar ratio of the mother liquor obtained in step (2) to the Y:X molar ratio of the one or more sources for $YO_2$ and the one or more sources for $X_2O_3$ contained in the mixture obtained in step (1), which was crystallized in step (2), is 2 or greater.

2. The process of claim 1, further comprising one or more of the following steps of
   (3) separating at least a portion of the zeolitic material from the mother liquor obtained in step (2).

3. The process of claim 2, wherein in step (3) the zeolitic material or a portion thereof is separated from the mother liquor by one or more steps of filtration, centrifugation and/or decantation methods.

4. The process of claim 2, further comprising one or more of the following steps of
   (4) washing the zeolitic material, and/or
   (5) drying and/or calcinating the zeolitic material, and/or
   (6) subjecting the zeolitic material to one or more ion-exchange procedures,
wherein the steps (4) and/or (5) and/or (6) can be conducted in any order.

5. The process of claim 1, wherein at least a portion of the zeolitic material obtained in step (2) is recycled to step (1) as seed crystals.

6. The process of claim 5, wherein the zeolitic material obtained in step (2) or a portion thereof is recycled to step (1) as seed crystals after the step or steps of
   (3) separating at least a portion of the zeolitic material from the mother liquor obtained in step (2),
   (4) washing the zeolitic material, and/or
   (5) drying and/or calcinating the zeolitic material.

7. The process of claim 5, wherein zeolitic material obtained in step (2) or a portion thereof is directly recycled to step (1) as seed crystals.

8. The process of claim 1, wherein at least a portion of the reaction mixture obtained from crystallization in step (2) is recycled to step (1) as seed crystals and as a source for $YO_2$.

9. The process of claim 1, wherein the amount of X in wt.-% contained in the mother liquor obtained in step (2), based on 100 wt.-% of the mother liquor, is equal to 50% or less of the amount of X in wt.-% from the one or more sources for $X_2O_3$ contained in the mixture obtained in step (1), based of 100 wt.-% of said mixture, which was crystallized in step (2).

10. The process of claim 1, wherein the seed crystals comprise one or more zeolitic materials comprising $YO_2$ and $X_2O_3$, obtainable and/or obtained, wherein Y is a tetravalent element, and X is a trivalent element.

11. The process of claim 1, wherein the seed crystals provided in step (1) comprise one or more zeolitic materials having a framework structure selected from the group consisting of LEV, BEA, MFI, ERI, and combinations of two or more thereof.

12. The process of claim 11, wherein the one or more zeolitic materials comprised in the seed crystals having an LEV framework structure comprise one or more zeolites selected from the group consisting of Levyne, LZ-132, NU-3, RUB-1, SAPO-35, ZK-20, ZSM-45, RUB-50, and mixtures of two or more thereof.

13. The process of any of claim 11, wherein the one or more zeolitic materials comprised in the seed crystals having a BEA framework structure comprises one or more zeolites selected from the group consisting of zeolite Beta, [B—Si—O]-BEA, [Ga—Si—O]-BEA, [Ti—Si—O]-BEA, Al-rich beta, CIT-6, Tschernichite, and mixtures of two or more thereof.

14. The process of claim 1, wherein steps (1) and (2) are repeated one or more times.

15. The process of claim 1, wherein Y is selected from the group consisting of Si, Sn, Ti, Zr, Ge, and mixtures of two or more thereof.

16. The process of claim 1, wherein X is selected from the group consisting of Al, B, In, Ga, and mixtures of two or more thereof.

17. The process of claim 1, wherein the one or more sources for $YO_2$ comprises one or more silica and/or silicates.

18. The process of claim 1, wherein the one or more sources for $X_2O_3$ comprises one or more aluminates.

19. The process of claim 1, wherein the $YO_2:X_2O_3$ molar ratio of the mixture according to step (1) ranges from 0.5 to 300.

20. The process of claim 1, wherein the amount of seed crystals in the mixture according to step (1) ranges from 0.01 to 30 wt.-% based on 100 wt.-% of $YO_2$ in the at least one source for $YO_2$.

21. The process of claim 1, wherein the one or more solvents in the mixture according to step (1) comprise water.

22. The process of claim 21, wherein the $H_2O:YO_2$ molar ratio of the mixture according to step (1) ranges from 5 to 200.

23. The process of claim 1, wherein the crystallization in step (2) involves heating of the mixture.

24. The process of claim 23, wherein the crystallization in step (2) is conducted under solvothermal conditions.

25. The process of claim 24, wherein the crystallization in step (2) involves heating of the mixture for a period ranging from 5 to 200 h.

26. The process of claim 1, wherein the crystallization in step (2) involves agitating the mixture.

* * * * *